United States Patent
Baba et al.

(10) Patent No.: US 10,236,754 B2
(45) Date of Patent: Mar. 19, 2019

(54) STATOR OF ROTARY ELECTRIC MACHINE

(71) Applicant: Hitachi Automotive Systems, Ltd., Hitachinaka-shi, Ibaraki (JP)

(72) Inventors: Yuichiro Baba, Ibaraki (JP); Kenichi Nakayama, Ibaraki (JP); Manabu Oshida, Ibaraki (JP); Shin Onose, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 157 days.

(21) Appl. No.: 15/518,640

(22) PCT Filed: Oct. 21, 2015

(86) PCT No.: PCT/JP2015/079626
§ 371 (c)(1),
(2) Date: Apr. 12, 2017

(87) PCT Pub. No.: WO2016/067981
PCT Pub. Date: May 6, 2016

(65) Prior Publication Data
US 2017/0237321 A1 Aug. 17, 2017

(30) Foreign Application Priority Data
Oct. 31, 2014 (JP) .................................. 2014-222208

(51) Int. Cl.
*H02K 3/04* (2006.01)
*H02K 15/06* (2006.01)
(Continued)

(52) U.S. Cl.
CPC .............. *H02K 15/065* (2013.01); *H02K 1/16* (2013.01); *H02K 3/12* (2013.01); *H02K 3/522* (2013.01);
(Continued)

(58) Field of Classification Search
CPC .... H02K 15/0081; H02K 15/065; H02K 1/16; H02K 3/12; H02K 3/18; H02K 15/066; Y10T 29/49071; Y10T 29/49009
(Continued)

(56) References Cited

U.S. PATENT DOCUMENTS 4,225,770 A 9/1980 Moore et al.
6,026,558 A 2/2000 Yoshida et al.
(Continued)

FOREIGN PATENT DOCUMENTS

CN 102208840 A 10/2011
JP 9-215280 A 8/1997
(Continued)

OTHER PUBLICATIONS

Extended European Search Report issued in counterpart European Application No. 15854301.7 dated Apr. 19, 2018 (eight (8) pages).
(Continued)

*Primary Examiner* — Thanh Lam
(74) *Attorney, Agent, or Firm* — Crowell & Moring LLP

(57) ABSTRACT

Provided is a stator of a rotary electric machine in which a bonding portion of ends of coil segments is formed at a coil end of the stator without being inflated toward the opposite side to a stator core, and the coil end can be minimized in an axial direction. The stator of the rotary electric machine includes a stator core (10) having a plurality of slots and a coil segment (30) which is disposed in the stator core to form a stator winding (3). The ends of the coil segments are overlapped in the axial direction, and bonded through the bonding portion. The bonding portion is formed in a shape such that the bonding portion is melted and flows down from the end (6a) of the coil segment on the opposite side to the stator core toward the end (5a) of the coil segment on a side near the stator core.

9 Claims, 23 Drawing Sheets

(51) Int. Cl.
*H02K 1/16* (2006.01)
*H02K 3/12* (2006.01)
*H02K 3/52* (2006.01)
*H02K 15/00* (2006.01)
*H02K 3/18* (2006.01)

(52) U.S. Cl.
CPC .......... H02K 15/0081 (2013.01); *H02K 3/18* (2013.01); *H02K 15/066* (2013.01)

(58) Field of Classification Search
USPC .................. 310/71, 201, 208, 179–180, 260
See application file for complete search history.

(56) References Cited

U.S. PATENT DOCUMENTS

| | | | | |
|---|---|---|---|---|
| 7,005,773 | B2* | 2/2006 | Nakamura | H02K 3/12 310/179 |
| 7,615,906 | B2* | 11/2009 | Sakai | H02K 3/12 29/596 |
| 7,786,644 | B2* | 8/2010 | Kitou | H02K 3/12 310/201 |
| 8,344,573 | B2* | 1/2013 | Hasegawa | H02K 3/38 310/180 |
| 8,669,681 | B2* | 3/2014 | Kaiser | H02K 5/22 174/74 R |
| 8,735,724 | B2* | 5/2014 | Muraki | H01R 4/70 174/88 R |
| 9,214,843 | B2* | 12/2015 | Jung | H02K 15/0087 |
| 2009/0200888 | A1 | 8/2009 | Tanaka et al. | |
| 2011/0181143 | A1 | 7/2011 | Hasegawa et al. | |
| 2011/0241461 | A1 | 10/2011 | Utaka | |
| 2014/0184011 | A1 | 7/2014 | Kaimori et al. | |

FOREIGN PATENT DOCUMENTS

| | | |
|---|---|---|
| JP | 11-308799 A | 11/1999 |
| JP | 11-341730 A | 12/1999 |
| JP | 2002-218689 A | 8/2002 |
| JP | 2009-219343 A | 9/2009 |
| JP | 2011-151975 A | 8/2011 |
| JP | 2013-5541 A | 1/2013 |
| JP | 2013-59156 A | 3/2013 |
| WO | WO 2008/152966 A1 | 12/2008 |

OTHER PUBLICATIONS

International Search Report (PCT/ISA/210) issued in PCT Application No. PCT/JP2015/079626 dated Feb. 16, 2016 with English-language translation (four (4) pages).

Japanese-language Written Opinion (PCT/ISA/237) issued in PCT Application No. PCT/JP2015/079626 dated Feb. 16, 2016 (four (4) pages).

* cited by examiner

STATOR OF ROTARY ELECTRIC MACHINE

TECHNICAL FIELD

The present invention relates to a rotary electric machine.

BACKGROUND ART

As a background technique of the related art, there is known an AC power generator for a vehicle having a stator in which dust is hardly attached to a bonding portion (for example, see PTL 1).

In addition, there is known a stator of a rotary electric machine in which the bonding portion (ends) of a plurality of conductor segment of the stator is coated with an insulating film, and the insulating film is configured not to be peeled off by a cooling air flow or powder dust mixed into the air flow (for example, see PTL 2).

CITATION LIST

Patent Literature

PTL 1: JP 11-341730 A
PTL 2: JP 2011-151975 A

SUMMARY OF INVENTION

Technical Problem

In the technique disclosed in PTL 1, the AC power generator for a vehicle is configured such that the electrical conductor is bonded on the stator, and the bonding portion is formed in a circular shape. Therefore, the stator is configured such that the dust is hardly attached to the bonding portion. However, since the bonding portion is formed in a circular shape, the bonding portion is formed larger than a cross-sectional dimension of the electrical conductor. Therefore, there is a concern that an insulating distance from the bonding portion to the other component may become short, and the size of the coil end may become large.

In the technique disclosed in PTL 2, as illustrated in FIG. 12 of PTL 2, a plurality of conductor segments disposed in the same slot form one-phase winding such that the tip end of one conductor segment and the tip end of another conductor segment are bent to the outside in a radial direction of a stator core, the bent tip ends are welded, and these processes are repeatedly performed on the plurality of conductor segments. Herein, as illustrated in FIG. 12 of PTL 2, the melted tip ends are increased in width compared to that of the electric conductor, and the insulating distance from the bonding portion to the other component becomes short. Therefore, there is a concern that the size of the coil end may become large.

In addition, when the stator winding disclosed in PTLs 1 and 2 is formed, the welding is normally performed from a direction of the tip end of the conductor segment. However, in a case where the tip end of a coil segment in one stator faces in the axial direction or the radial direction, the direction of a welding electrode is necessarily changed according to the direction of the coil segment.

An object of the invention is to provide a stator of a rotary electric machine in which a bonding portion of ends of coil segments is formed without being inflated toward the opposite side to the stator core, and a coil end can be minimized in an axial direction.

Solution to Problem

In order to solve the above problems, the configurations disclosed in claims are employed for example. This application includes a plurality of aspects to solve the above problems. As an example, there is a provided a rotary electric machine which includes a stator core having a plurality of slots and a coil segment disposed in the stator core to form a stator winding. The ends of the coil segments are overlapped in the axial direction and bonded. The end on the opposite side to the stator core is melted and flows toward the end on a side near the stator core.

Advantageous Effects of Invention

According to the invention, it is possible to provide a stator of a rotary electric machine in which a bonding portion of ends of coil segments is formed without being inflated toward the opposite side to the stator core, and a coil end can be minimized in an axial direction.

Objects, configurations, and features other than those described above will become clear through the explanation about the following embodiments.

DESCRIPTION OF EMBODIMENTS

Hereinafter, embodiments of the invention will be described using the drawings.

Further, the description in the following will be given about an electric motor used in a hybrid electric automobile as an example of a rotary electric machine. In addition, an "axial direction" in the following description indicates a direction along a rotation shaft of the rotary electric machine. A circumferential direction indicates a direction along a rotation direction of the rotary electric machine. A "diameter direction" indicates a rotary radial direction (radial direction) about the rotational shaft of the rotary electric machine. An "inner peripheral side" indicates an inner side (inner diameter side) in the radial direction, and an "outer peripheral side" is the opposite direction thereof (that is, the outer side (outer diameter side) in the radial direction).

First Embodiment

The description will be given about a configuration of a stator of a rotary electric machine according to a first embodiment of the invention using FIGS. 1 to 4.

Figure 1:
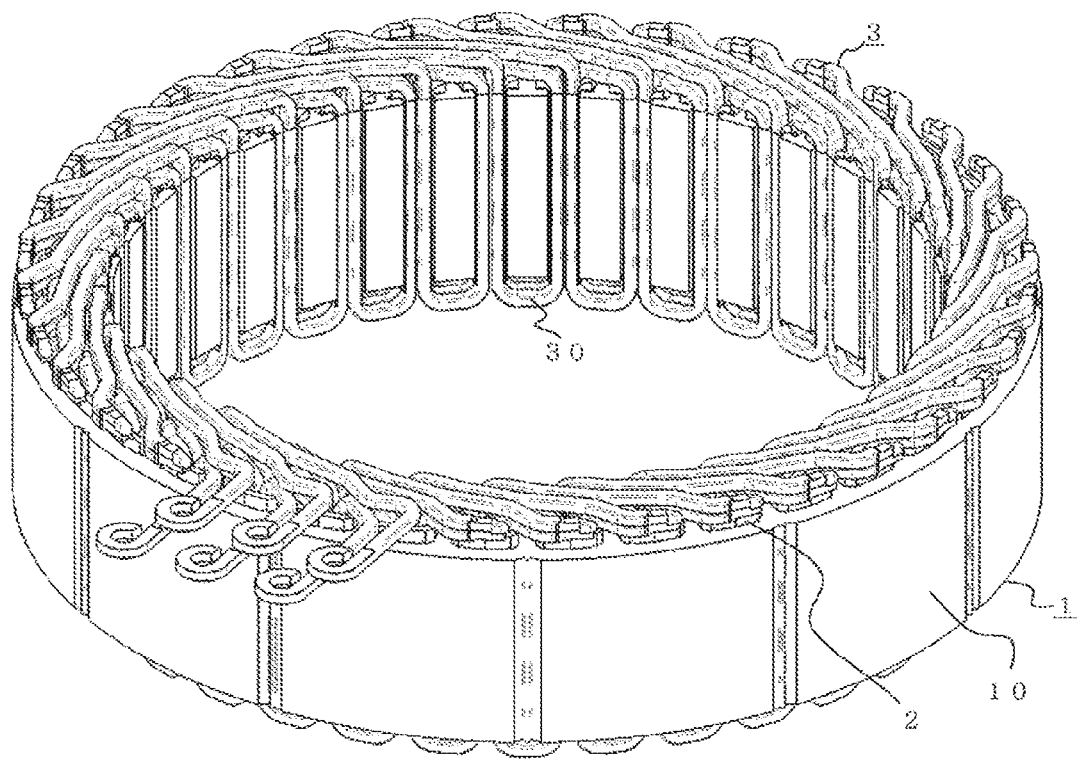
FIG. 1 is a perspective view illustrating a configuration of a stator of a rotary electric machine (first embodiment).

FIG. 1 is a perspective view illustrating a configuration of a stator 1 of the rotary electric machine. The stator 1 is configured by a stator core 10 and a stator winding 3.

The stator core 10 is molded by punching or etching in an annular shape, and is configured by stacking a plurality of electromagnetic steel sheets of which the thickness is about 0.05 to 1.0 mm. The stator core is made of a yoke on the outer diameter side and a plurality of teeth disposed in a radial shape at an equal interval in the circumferential direction, and is formed in a substantially cylinder shape. The stator core 10 is a full-open slot type configured by almost the straight teeth, and is formed to easily mount a stator coil from the inner diameter side of the stator core.

In the teeth (or the slot) of the stator core, an insulating member 2 is mounted. The insulating member 2 is configured by a bobbin molded with an insulating resin or an insulating sheet for example. The insulating member 2 in the first embodiment is formed to be opened on the inner diameter side similarly to the shape of the stator core, and is formed to easily mount the stator coil from the inner diameter side of the stator core.

In the teeth, a coil segment 30 wounded with a concentrated winding is mounted from the central side of the stator core. The rotary electric machine according to this embodiment is a three-phase AC rotary electric machine having 24 poles and 36 slots. Therefore, there are provided 36 teeth in the stator 1, and the stator winding is divided into three-phase stator windings of U, V, and W phases, and the same-phase coil segments mounted in the different teeth are connected in series.

Figure 21:
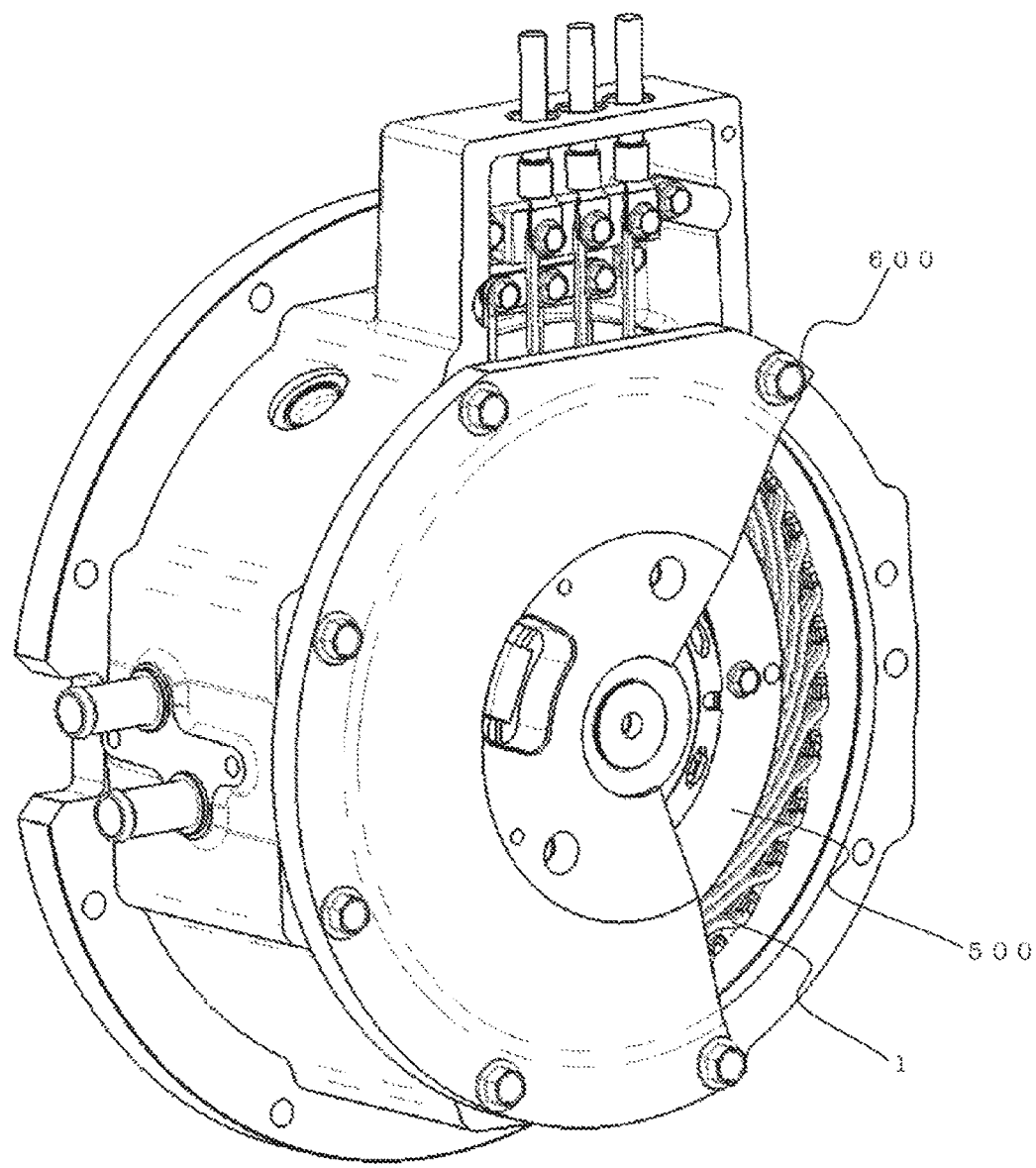
FIG. 21 is a diagram illustrating an example of a state where a stator and a rotor are disposed in a housing.
Figure 22:
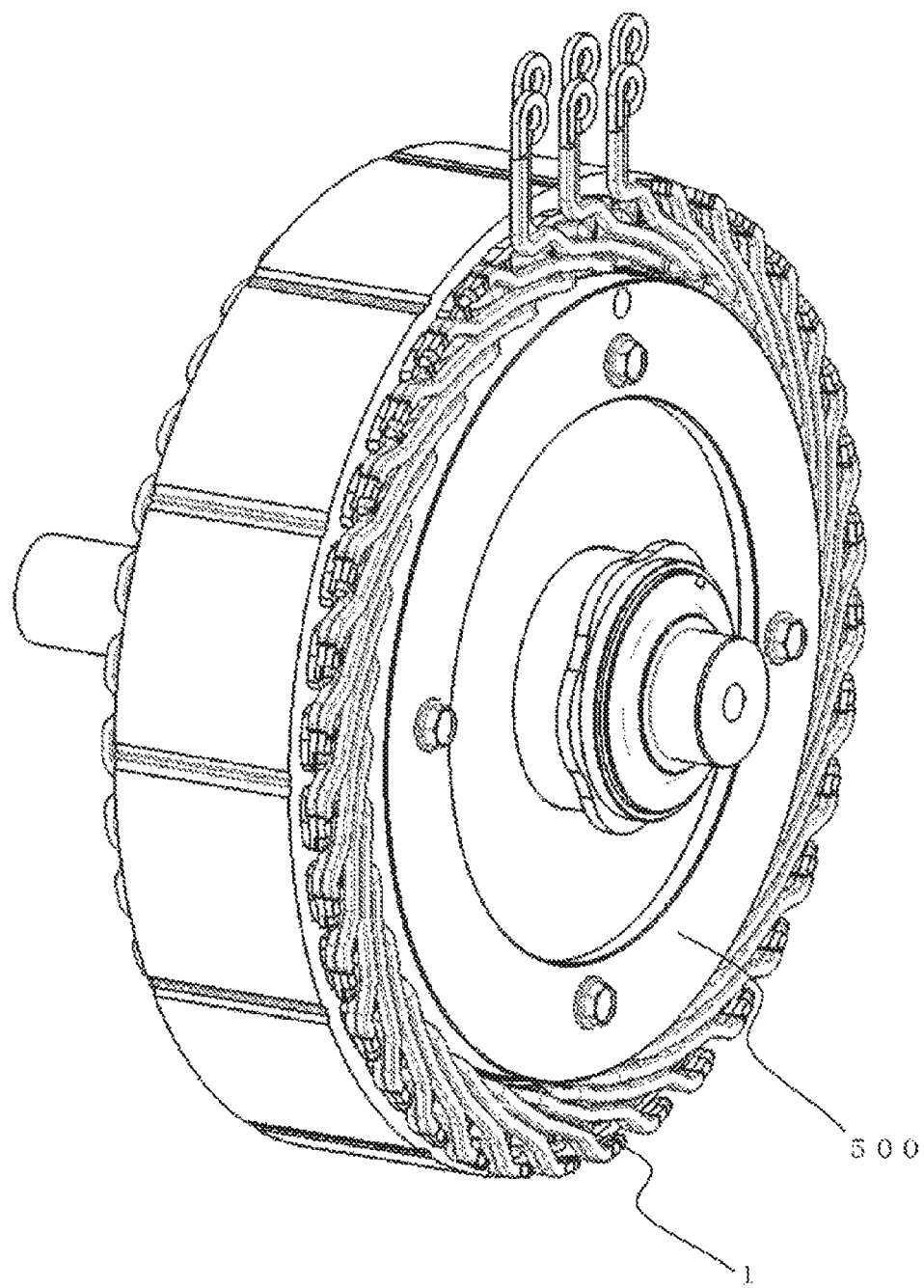
FIG. 22 is a diagram illustrating the entire rotary electric machine.

As illustrated in FIG. 22, a rotor 500 is disposed to be rotatably held through an air gap on the central side of the stator 1. A magnetic circuit of the rotary electric machine is configured by the stator 1, the rotor 500, and the air gap. The housing 600 may be provided on the outer diameter side of the stator 1 as illustrated in FIG. 21.

Figure 2:
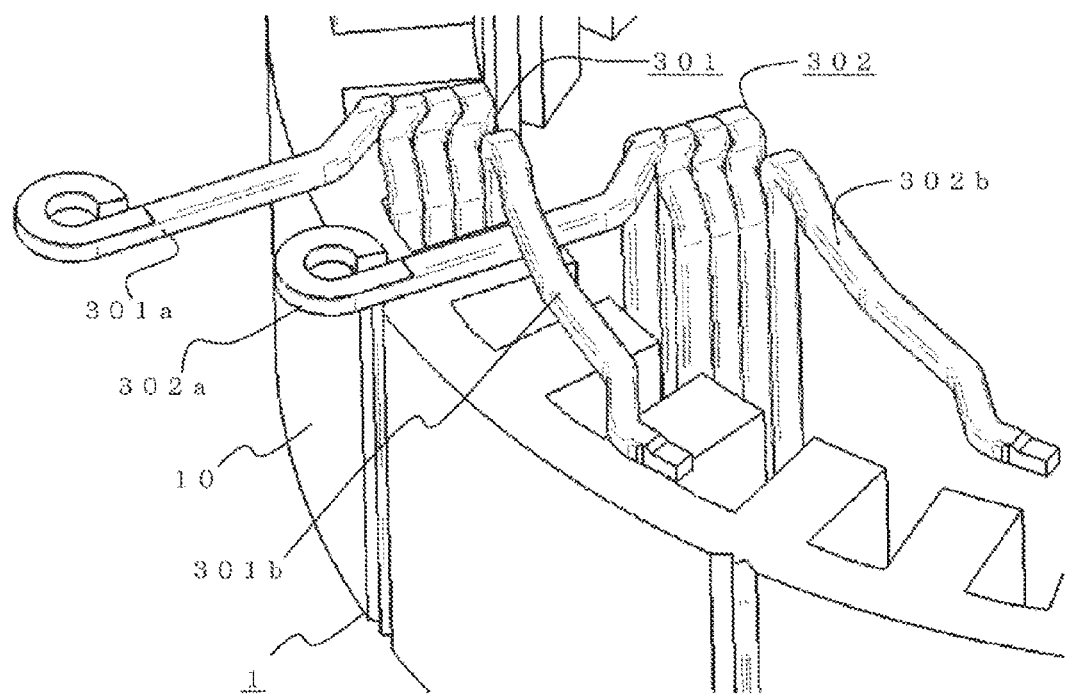
FIG. 2 is a perspective view illustrating a state in the middle of assembling the stator of the rotary electric machine (first embodiment).

A configuration of the stator 1 in the middle of assembling is illustrated in FIG. 2. A coil segment 301 is a coil segment firstly mounted in the stator core 10 in the stator 1.

A coil segment 302 secondly mounted in the stator core 10 is a coil segment disposed adjacent to the coil segment 301. A terminal 302a on a winding start side of the coil segment 302 is mounted in the teeth of the stator core 10 while passing through an interval between a terminal 301b on a winding end side of the coil segment 301 already disposed.

Then, the coil segment adjacent to the coil segment which is finally mounted in the same order is sequentially mounted in the stator core.

Further, the stator of this embodiment is a stator of the three-phase AC rotary electric machine. Therefore, when the stator coil firstly mounted is set to the U phase, the stator coil secondly mounted is set to the V phase, and the stator coil thirdly mounted is set to the W phase, the U, V, and W phases are repeatedly formed as the phases of the stator coil thereafter.

Figure 3:
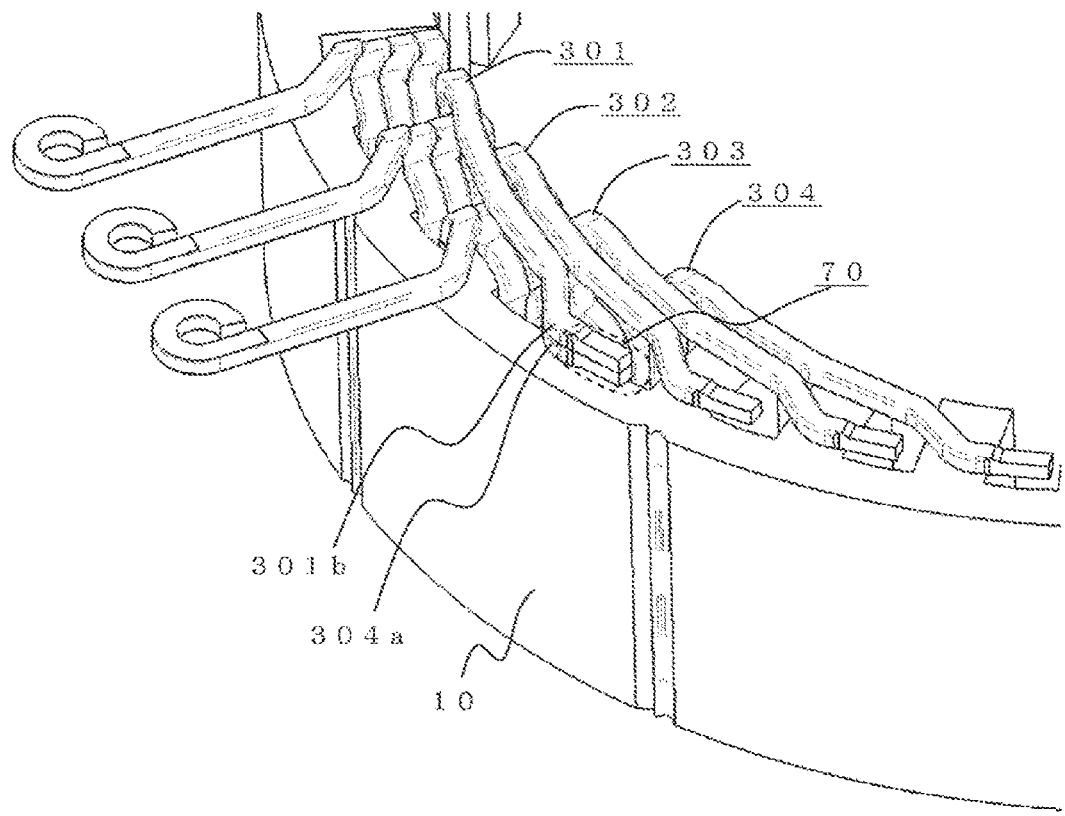
FIG. 3 is a perspective view illustrating a state in the middle of assembling the stator of the rotary electric machine (first embodiment).

FIG. 3 illustrates a structure of the stator 1 in a state where the coil segment is fourthly mounted in the stator core.

A terminal 304a on a winding start side of a coil segment 304 fourthly mounted and a terminal 301b on a winding end side of the coil segment 301 are overlapped with each other in an axial direction.

Since the ends of the coil segments are molded in advance to be overlapped with each other in the axial direction, the ends of the coil segments are overlapped in the axial direction on a yoke of the stator core facing in an outer circumferential direction of the stator core only by mounting the coil segment in the stator core.

Figure 4:
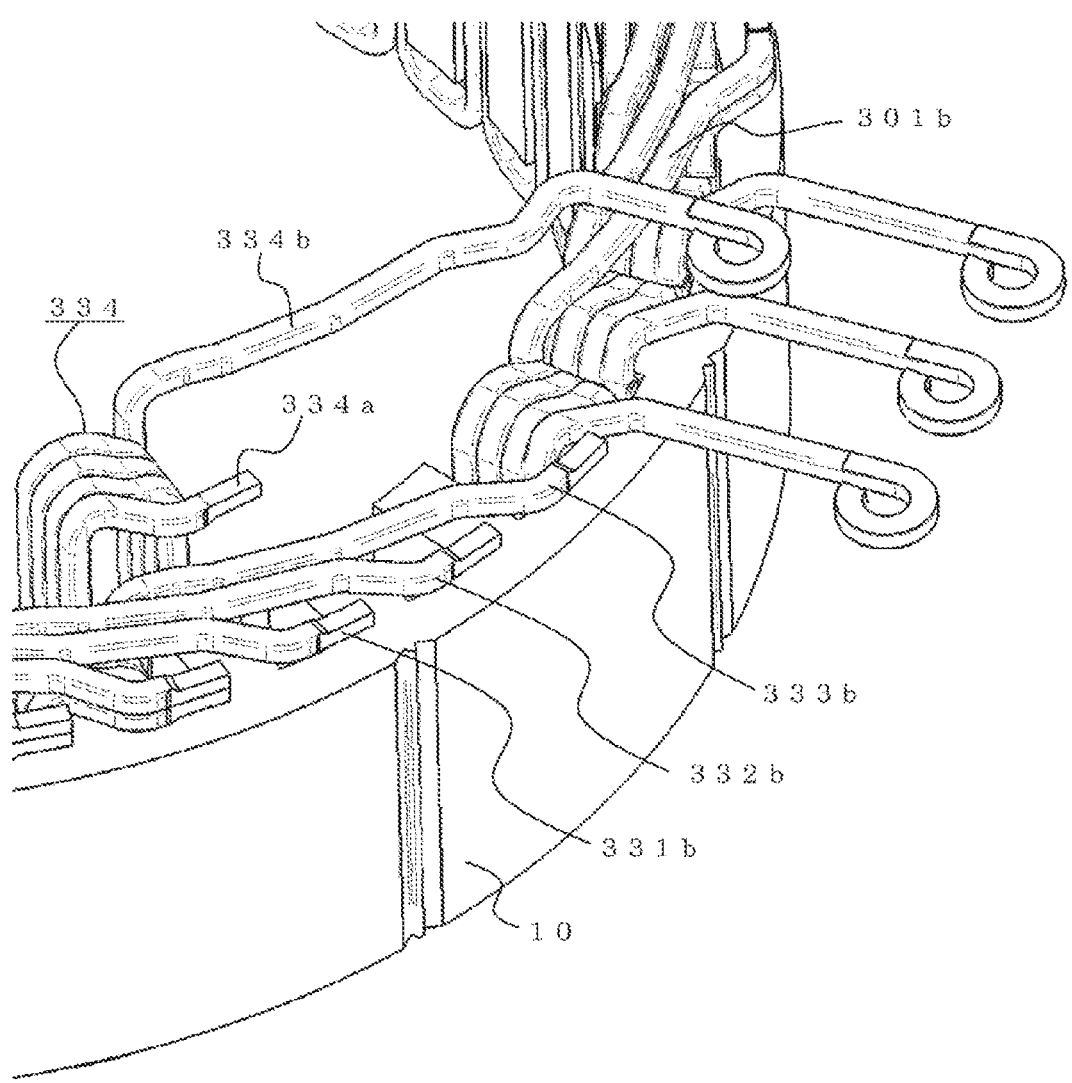
FIG. 4 is a perspective view illustrating a state in the middle of assembling the stator of the rotary electric machine (first embodiment).

FIG. 4 illustrates a structure of the stator 1 in the middle of mounting the coil segment in the 34th order.

A coil segment 334 mounted in the stator core in the 34th order is configured such that a terminal 334a on a winding start side of the coil segment 334 is mounted in the teeth of the stator core while passing through an interval between terminals 331b to 333b on a winding end side of the coil segments 331 to 333 and the stator core 10.

A terminal 334b on a winding end side of the coil segment 334 is disposed outside the core end in the outer circumferential direction of the stator core while passing on an opposite side to the stator core with respect to the terminal 301b on a winding end side of the coil segment 301.

Then, the coil segment adjacent to the finally-mounted coil segment in the same order is sequentially mounted in the stator core until the 36th order.

As described above, according to this embodiment, the ends of the coil segments can be disposed to be overlapped in the axial direction on the yoke of the stator core facing in the outer circumferential direction of the stator core only by mounting all the coil segments in the teeth even when there is no molding work afterward.

In the stator 1 mounted with all of the coil segments, the ends of the coil segments overlapped in the axial direction are connected.

A bonded portion of the ends of the coil segments is necessarily formed long to some degree in consideration of a peeling workability of an insulating film of the bonded portion of the coil segments when the ends of the coil segments are connected to each other, or a risk of excessive heat transmission to the other portions except the bonded portion at the time of welding.

In the stator 1 of the first embodiment, the end of the coil segment serving as the bonded portion extends in the circumferential direction on the yoke of the stator core, so that the length of the bonded portion can be secured while keeping the end of the coil segment within the outer diameter of the stator core.

On the other hand, the stator 1 is configured such that the end of the coil segment is disposed to face in the circumferential direction. Therefore, upon welding the end of the coil segment (to be described below), the electrode interferes in the coil segment when a welding electrode is disposed in a direction of the tip end of the coil segment.

For this reason, in the stator 1 of this embodiment, the welding electrode is positioned in a side surface direction (that is, the axial direction) of the bonded portion of the coil segment. Therefore, the ends of the coil segments can be bonded without causing the welding electrode to interfere in the other coil segments.

In addition, the energy generated by the electrode is transferred from the end of the coil segment on the opposite side to the stator core among the ends of the coil segments overlapped in the axial direction by setting the welding electrode to the portion on the side surface direction of the bonded portion of the coil segment.

Therefore, the coil segment is easily melted from the end on the opposite side to the stator core, and the shape is easily formed to be melted down from the end of the coil segment on the opposite side to the stator core toward the end of the coil segment on a side near the stator core.

Next, a bonding portion will be described in detail.

Figure 5:
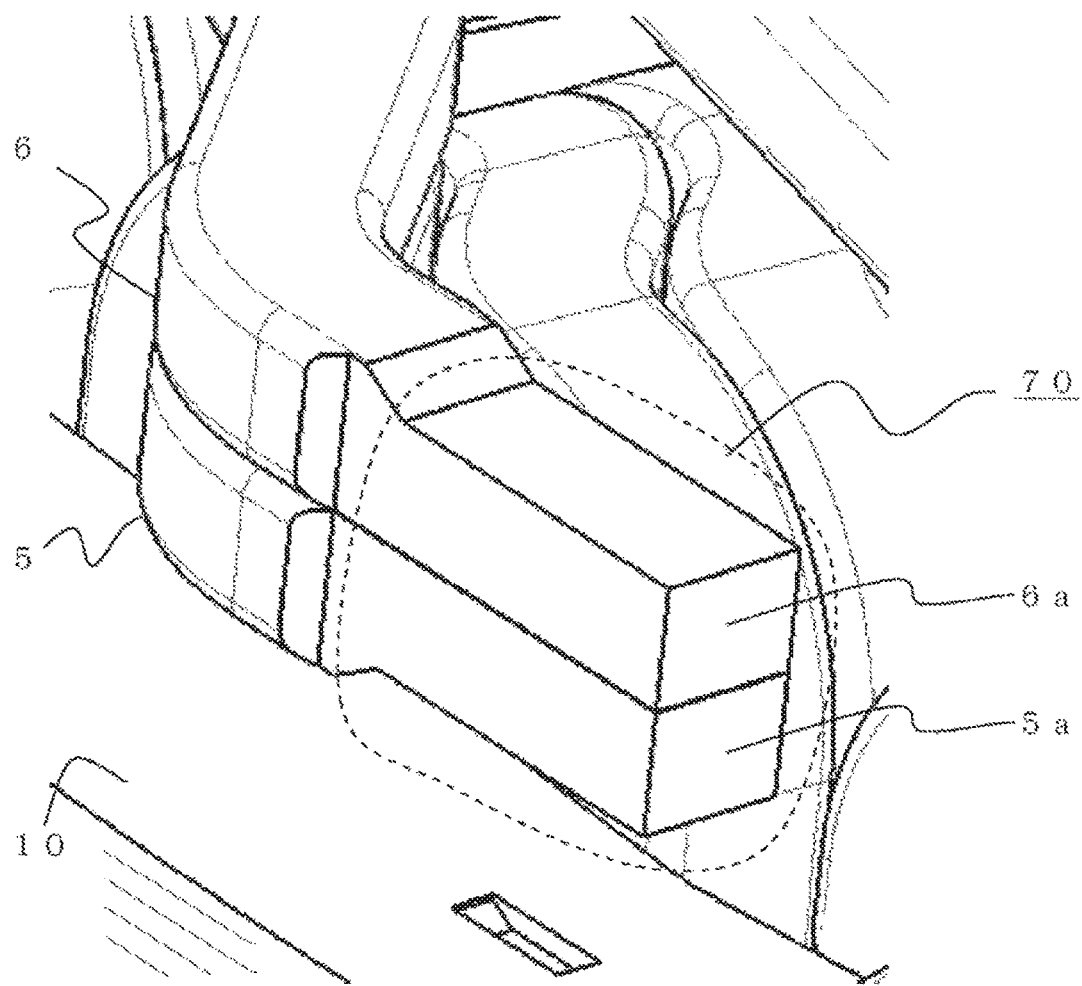
FIG. 5 is a diagram illustrating the shape of the ends of the coil segments before bonding (first embodiment).

FIG. 5 illustrates a state before bonding the ends of the coil segments which are overlapped in the axial direction on the yoke of the stator core 10.

An end 5a of a coil segment 5 on a side near the stator core and an end 6a of a coil segment 6 on the opposite side to the stator core abut on each other in a state where the insulating film is removed to expose a conductor, and form a bonded portion 70. The bonded portion 70 is bonded by a TIG (Tungsten Inert Gas) welding for example.

Figure 6:
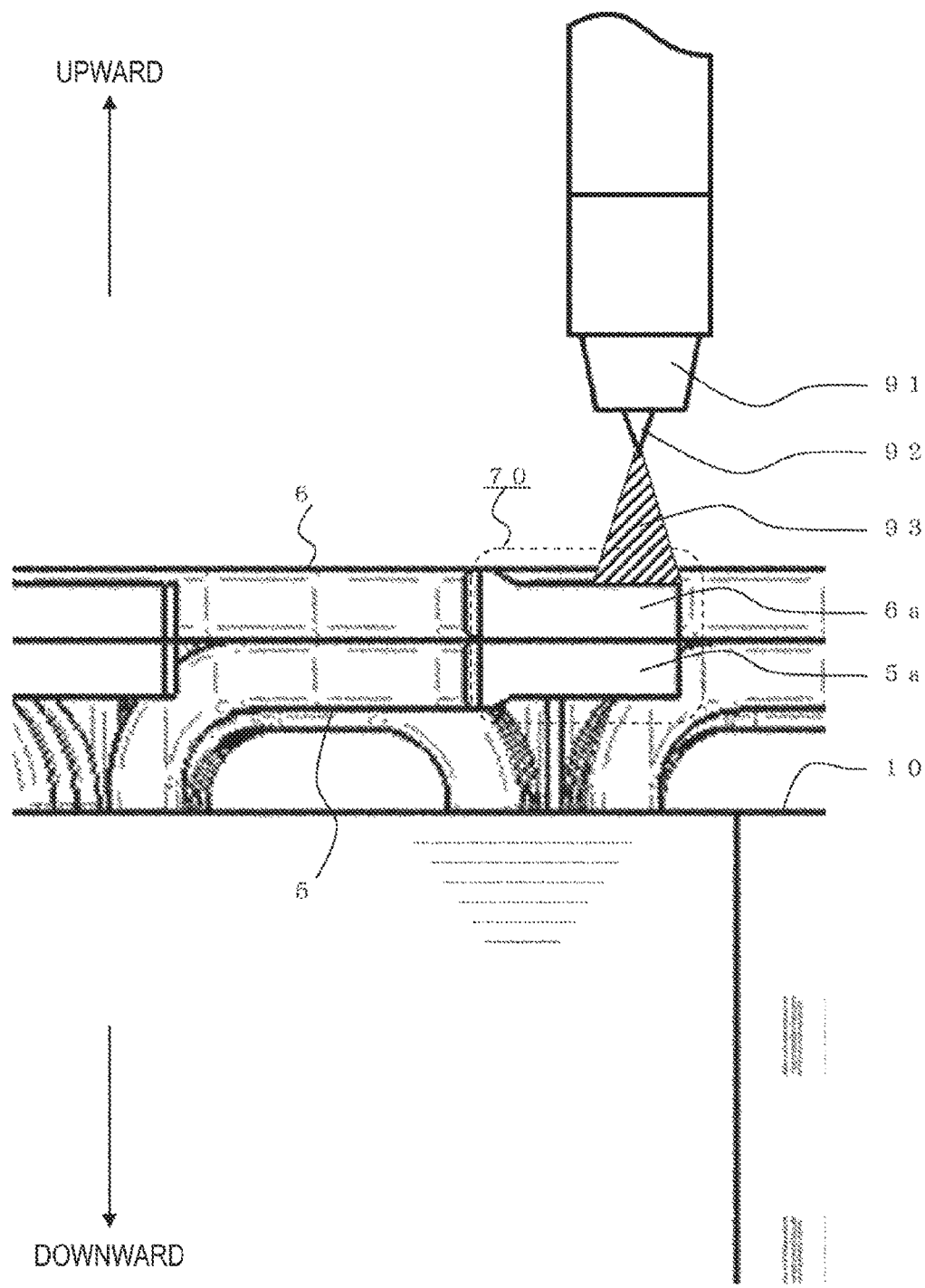
FIG. 6 is a diagram illustrating an example of a TIG welding of the ends of the coil segments (first embodiment).

FIG. 6 illustrates a state where the end of the coil segment is bonded by the TIG welding. The TIG welding is performed from one end surface among the ends of the coil segments. An inactive gas such as argon (Ar) or helium (He) is injected by a gas nozzle 91, and an arc 93 is generated between a welding electrode 92 and the end of the coil segment in an atmosphere of the inactive gas.

The stator 1 of this embodiment is configured such that the electrode of the TIG welding is disposed in the axial direction (the side surface direction) of the end of the coil segment. The tip end of the electrode is located at a position of about ±2 mm from the tip end of the coil segment on the opposite side to the stator core.

The energy generated by the arc is transferred to the end 6a of the coil segment on the opposite side to the stator core. The end 6a is melted from a portion of which the temperature rises up to a melting point.

The energy generated by the arc is transferred from the end 6a of the coil segment on the opposite side to the stator core even toward the end 5a of the coil segment on a side near the stator core, so that part of the portion of the end 5a of the coil segment on a side near the stator core is also melted.

Figure 7:
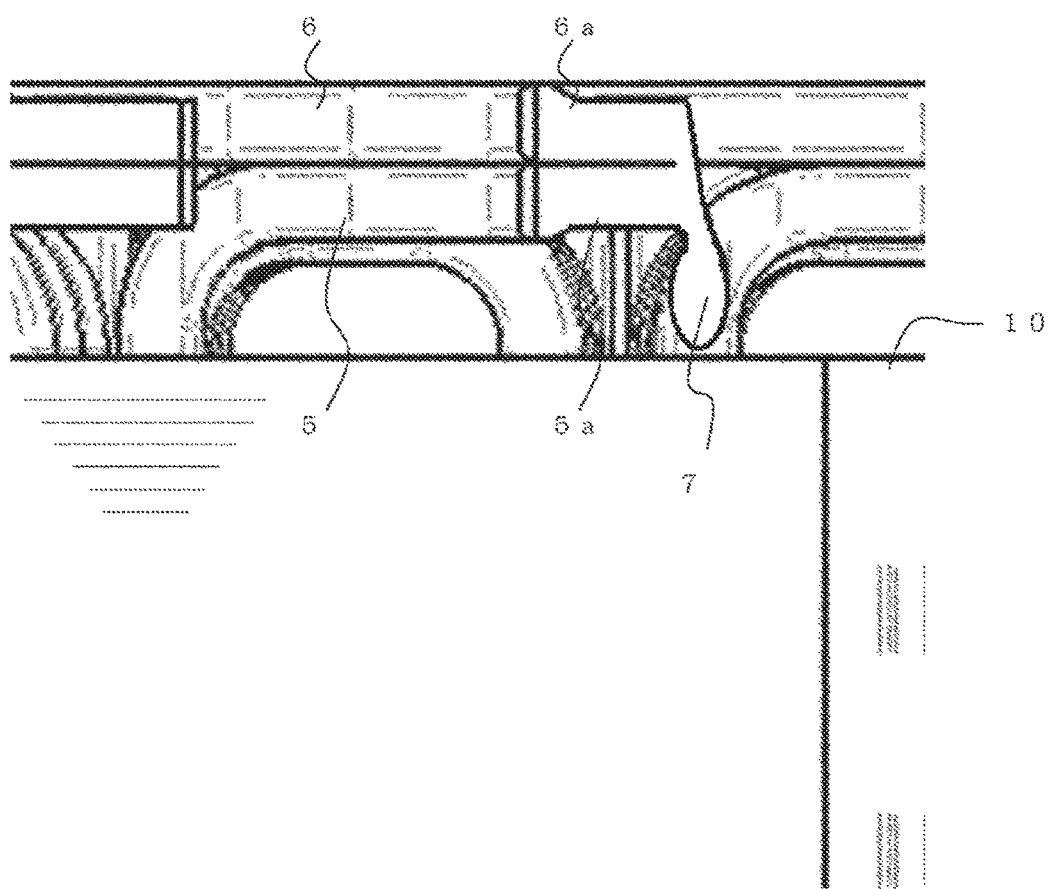
FIG. 7 is a diagram illustrating an example of failure in welding the ends of the coil segments.

When the energy generated by the arc is too large, not only the end of the coil segment on the opposite side to the stator core but also the end of the coil segment on a side near the stator core is melted over a wide range. Therefore, as illustrated in FIG. 7, a bonding portion 7 flows down from the end of the coil on a side near the stator core toward the stator core. For this reason, a current amount and an energization time for the welding are selected to be an appropriate energy at the time of welding.

The end 6a of the melted coil segment on the opposite side to the stator core is widely drawn to the end 5a of the coil segment on a side near the stator core, and then the melted portion is solidified when the temperature is lowered by natural heat radiation.

In the above welding procedure, the bonding portion comes to be a shape melting down from the end of the coil segment on the opposite side to the stator core toward the end of the coil segment on a side near the stator core.

Upon performing the TIG welding, when the bonding is performed by setting the axial direction to the vertical direction and disposing the stator such that the bonded portion 70 is disposed to face upward, the melted coil segment is easily drawn down to the end of the coil segment on a side near the stator core by its own weight.

Figure 8A:
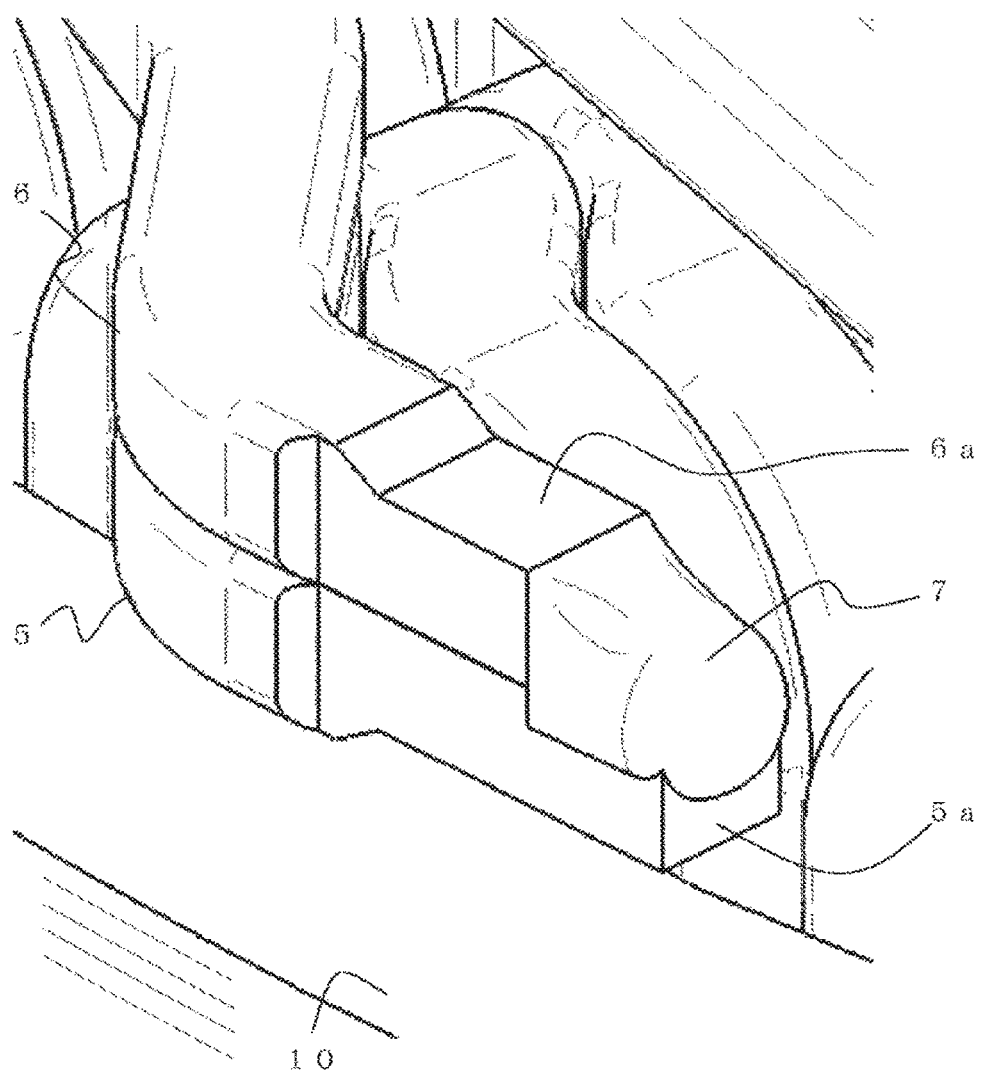
FIG. 8A is a diagram illustrating the shape of the ends of the coil segments after bonding (first embodiment).
Figure 8B:
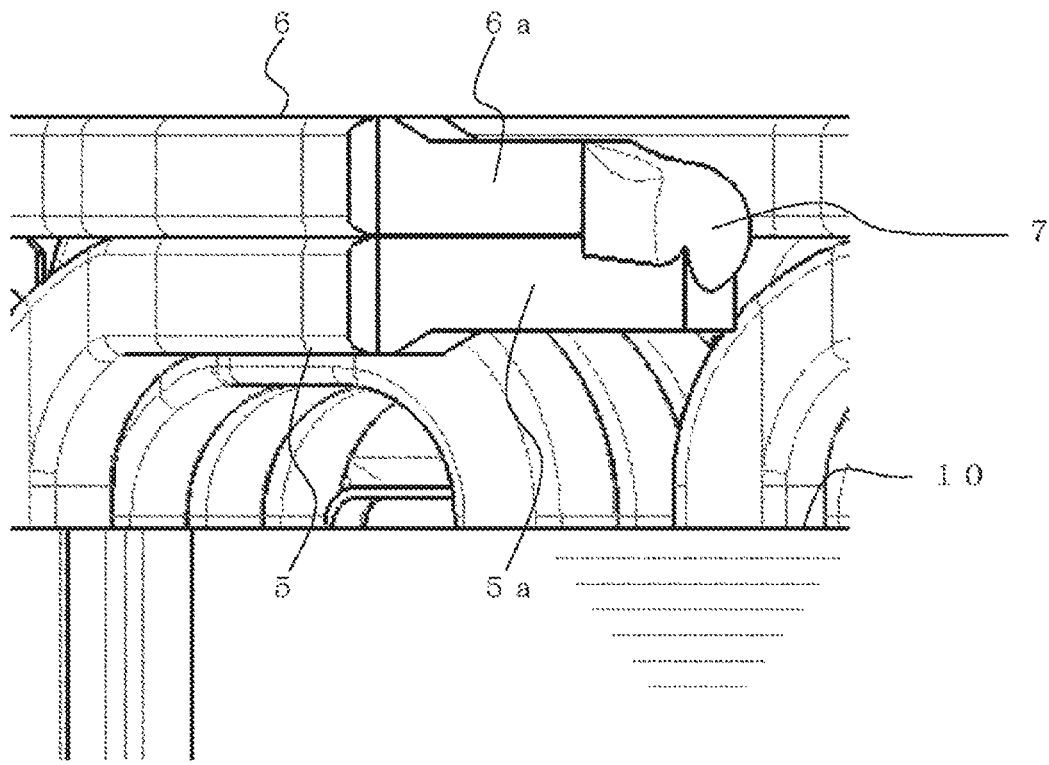
FIG. 8B is a diagram illustrating the shape of the ends of the coil segments after bonding (first embodiment).

FIGS. 8a and 8b illustrate the end of the coil segment in a state where the melted portion is solidified to form the bonding portion 7 after the arc ends in the TIG welding and the bonding is completed. Since the melted portion is solidified after being drawn toward the end 5a of the coil segment on a side near the stator core, the bonding portion is formed without causing the coil end of the stator to be inflated toward the opposite side to the stator core, and thus the coil end of the stator is securely minimized in the axial direction.

Figure 9:
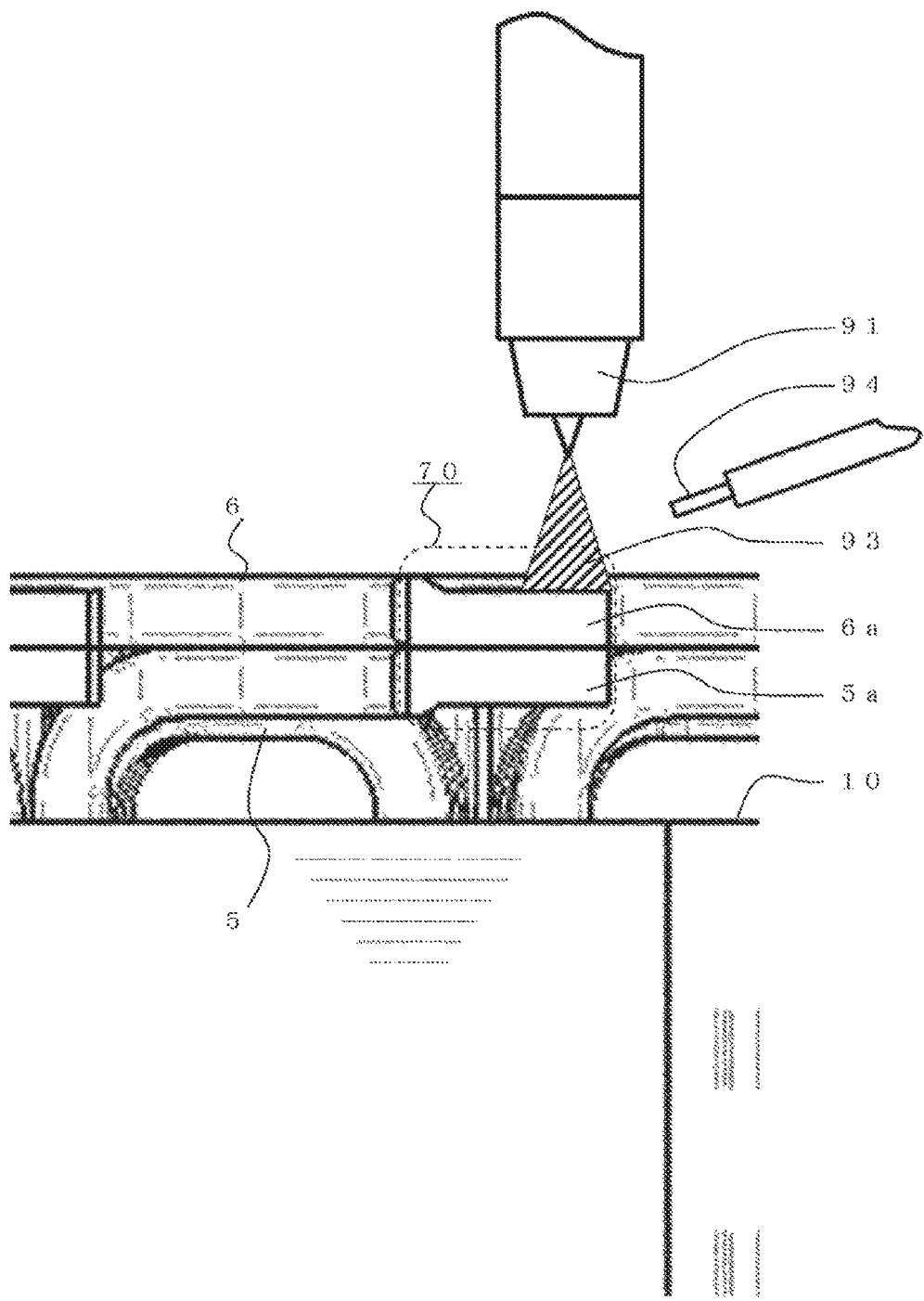
FIG. 9 is a diagram illustrating an example of a TIG brazing of the ends of the coil segments (first embodiment).

In addition, as illustrated in FIG. 9, a metal (a brazing material 94) having a low melting point having an affinity with the material of the coil segment is inserted from the outside during the arc is generated so as to enable a TIG brazing.

The coil segment is a typical conductor made of copper having a high melting point. In the TIG brazing, in the bonding portion of the end of the coil segment, the metal (brazing material) can be melted using less energy by melting the coil segment. Therefore, it is possible to suppress the thermal intensity from being transferred from the end of the coil segment to the main part of the coil segment at the time of bonding. Further, it is possible to reduce a risk that the insulating film of the coil segment is thermally degraded.

The energy generated by the arc in the TIG brazing melts the end 6a of the coil segment on the opposite side to the stator core and the brazing material 94. In addition, since the end 5a of the coil segment on a side near the stator core is also increased in temperature, the melted brazing material has a low surface tension, is widened to the end 5a of the coil segment on a side near the stator core by wettability, is drawn to the end 5a, and then is solidified as the temperature is reduced due to a natural heat radiation, so that the bonding portion 7 is formed.

Second Embodiment

Figure 10:
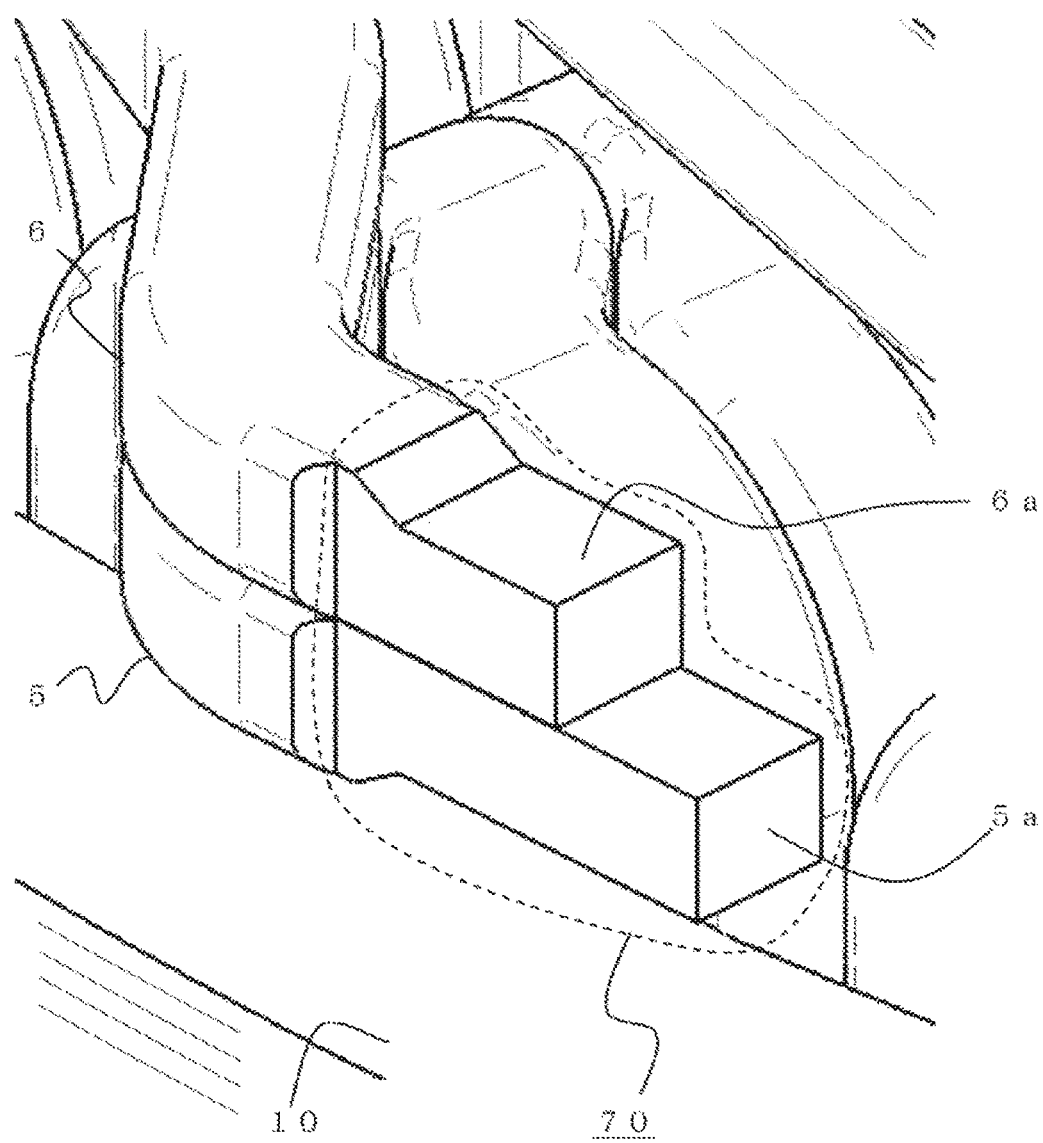
FIG. 10 is a diagram illustrating the shape of the ends of the coil segments before bonding (second embodiment).

FIG. 10 illustrates a state before bonding the ends of the coil segments which are overlapped in the axial direction on the yoke of the stator core 10.

The end 6a of the coil segment on the opposite side to the stator core is set at a position shorter by a step than the end 5a of the coil segment on a side near the stator core, and a stepped space is configured on the end 5a of the coil segment on a side near the stator core.

With the stepped space, there is secured a large area so that the end of the melted coil segment on the opposite side to the stator core can be widened onto the coil segment on a side near the stator core. Therefore, compared to the first embodiment, the end of the melted coil segment can be further drawn onto the end 5a of the coil segment which is positioned on a side near the stator core.

In addition, in a welding such as the TIG brazing where metal is supplied from the outside, the volume of the bonding portion becomes large by the amount of metal supplied from the outside. Therefore, there is a concern that the bonding portion becomes larger than the height (axial direction) of the coil segment. However, in a second embodiment, the allowable volume of the bonding portion becomes large by the stepped space on the end of the coil segment 5a, the height (axial direction), and the bonding portion is not inflated over the height (axial direction) of the coil segment on the opposite side to the stator core, so that the coil end can be securely miniaturized in the axial direction of the motor.

Figure 11:
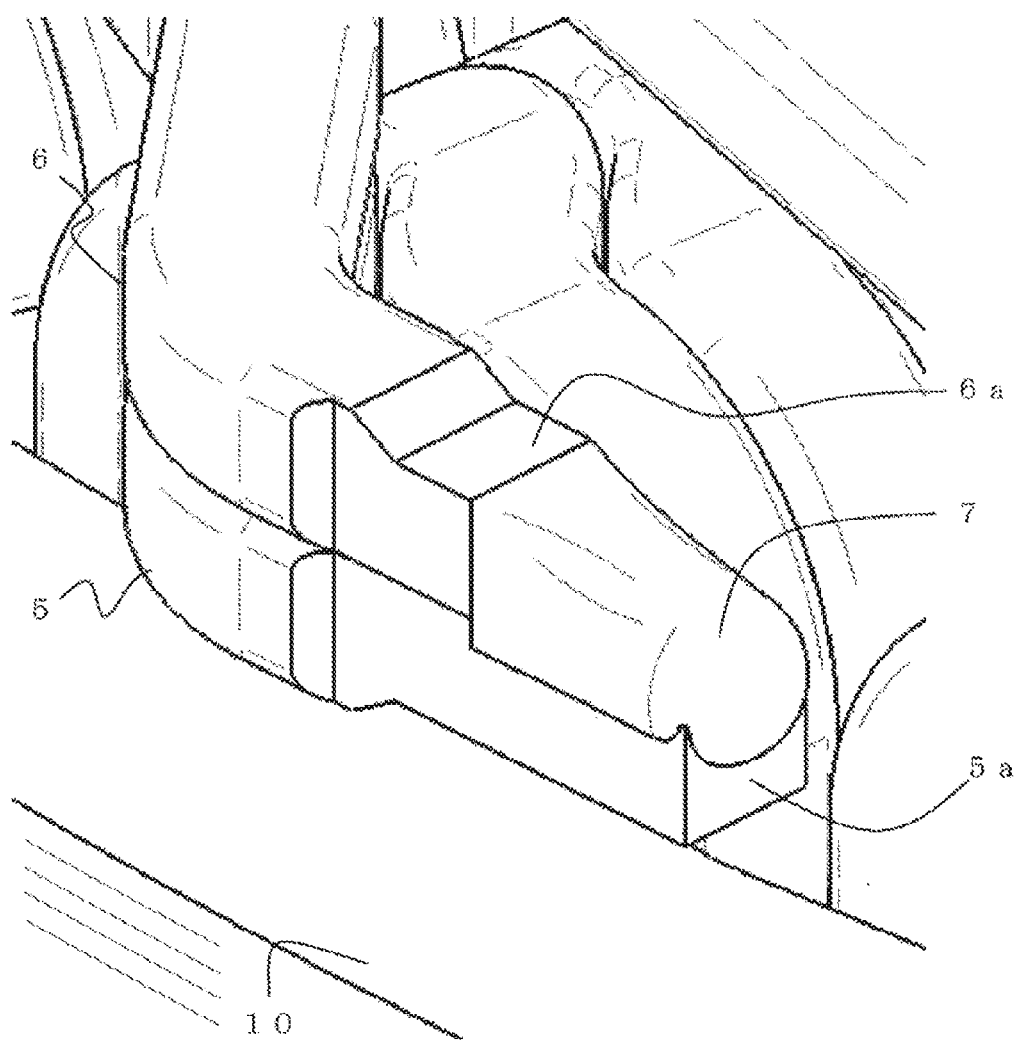
FIG. 11 is a diagram illustrating the shape of the ends of the coil segments after bonding (second embodiment).

FIG. 11 illustrates the end of the coil segment in a state where the melted portion is solidified to form the bonding portion 7 after the arc ends in the TIG welding (or the TIG brazing) and the bonding is completed. Since the melted portion is solidified after being drawn toward the end 5a of the coil segment on a side near the stator core, the bonding portion is formed without causing the coil end of the stator to be inflated toward the opposite side to the stator core, and thus the coil end of the stator is securely minimized in the axial direction.

Third Embodiment

Figure 12:
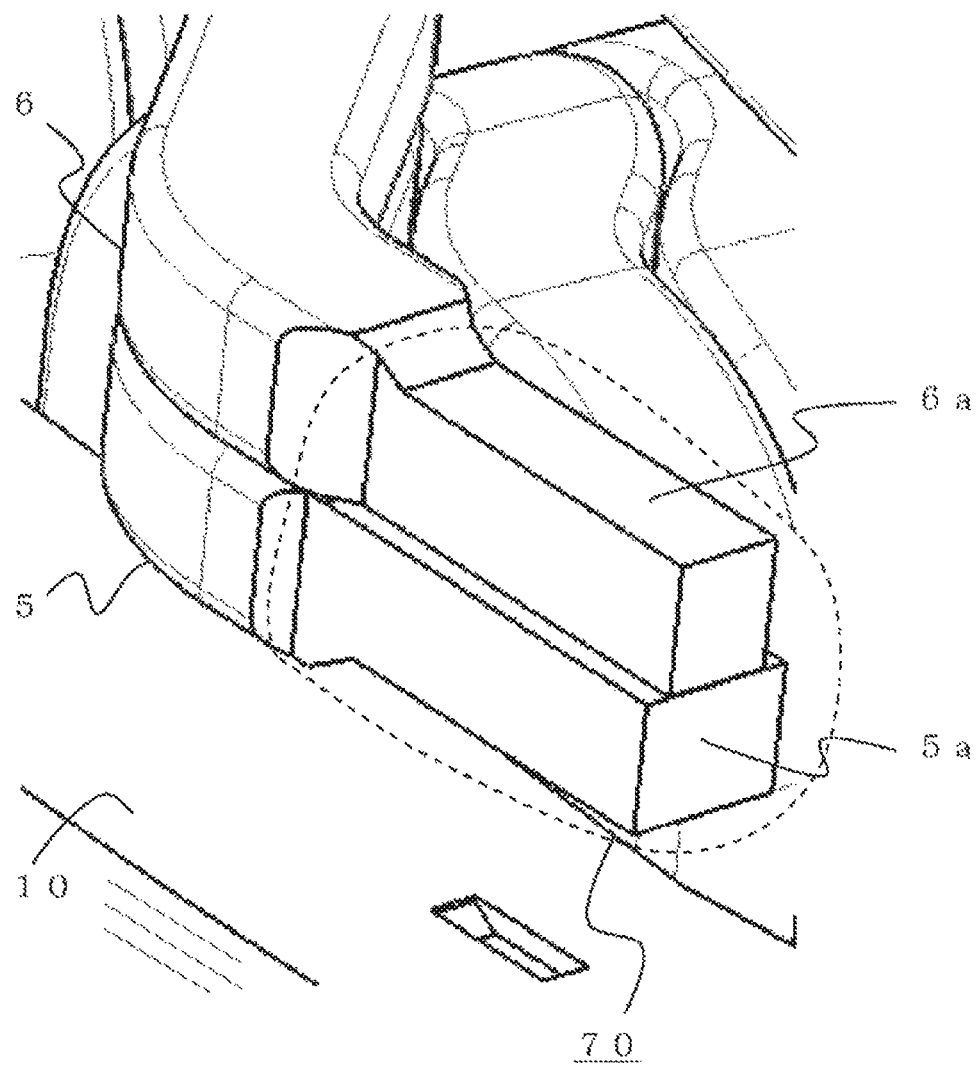
FIG. 12 is a diagram illustrating the shape of the ends of the coil segments before bonding (third embodiment).

FIG. 12 illustrates a state before bonding the ends of the coil segments which are overlapped in the axial direction on the yoke of the stator core 10.

The end 6a of the coil segment on the opposite side to the stator core is set to have a cross-sectional area smaller than that of the end 5a of the coil segment on a side near the stator core.

At the time of the TIG welding, the energy caused by the arc generated from the side surface direction of the end of the coil segment is transferred onto the end of the coil segment on the opposite side to the stator core, and then transferred onto the end of the coil segment on a side near the stator core. Herein, in a case where the energy caused by the arc is large, the end of the coil segment on the opposite side to the stator core is melted, and the end of the coil segment on a side near the stator core is also melted over a wide range. Therefore, as illustrated in FIG. 7, the bonding portion 7 flows down from the coil end on a side near the stator core toward the state core.

In this embodiment, since the end 6a of the coil segment on the opposite side to the stator core has a volume smaller than the end 5a of the coil segment on a side near the stator core, the end 6a of the coil segment on the opposite side to the stator core easily rises in temperature. Therefore, the end of the coil segment on the opposite side to the stator core is mainly melted down while suppressing the energy amount caused by the arc and suppressing the melting amount of the coil segment on a side near the stator core, so that the bonding portion can be securely disposed in the coil segment on the opposite side to the stator core.

Further, similar to the second embodiment, the volume of the bonding portion becomes large by the amount of metal supplied from the outside in the welding such as the TIG brazing where the metal is supplied from the outside. Therefore, there is a concern that the bonding portion becomes larger than the height (axial direction) of the coil segment. However, in a third embodiment, the allowable volume of the bonding portion becomes large by the stepped space on the end of the coil segment 5a, and the bonding portion is not inflated over the height (axial direction) of the coil segment on the opposite side to the stator core, so that the coil end can be securely miniaturized in the axial direction of the motor.

Figure 13:
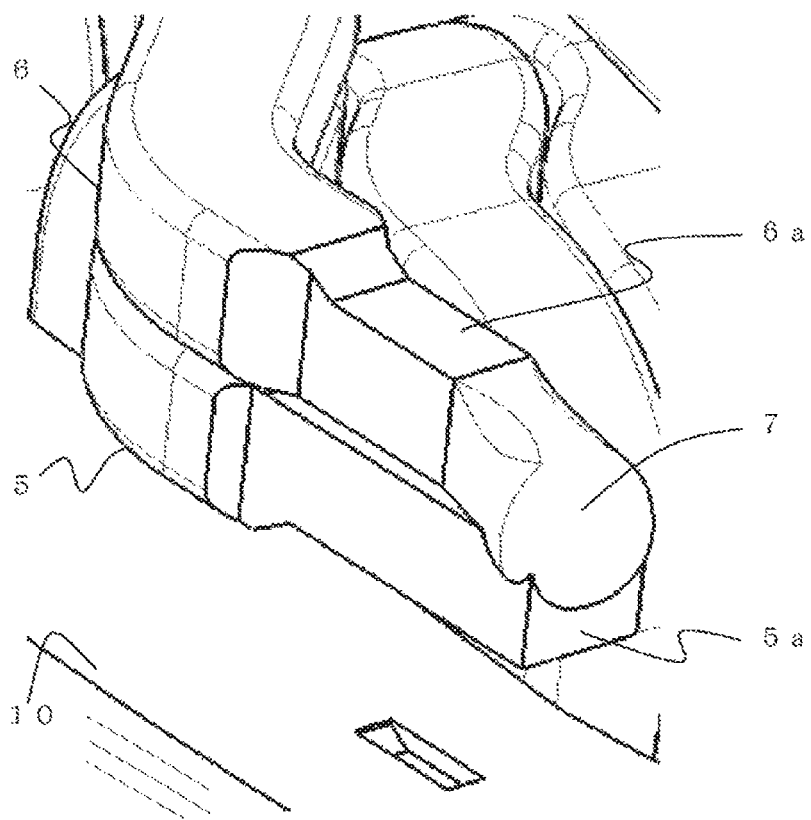
FIG. 13 is a diagram illustrating the shape of the ends of the coil segments after bonding (third embodiment).

FIG. 13 illustrates the end of the coil segment in a state where the melted portion is solidified to form the bonding portion 7 after the arc ends in the TIG welding (or the TIG brazing) and the bonding is completed. Since the melted portion is solidified after being drawn toward the end 5a of the coil segment on a side near the stator core, the bonding portion is formed without causing the coil end of the stator to be inflated toward the opposite side to the stator core, and thus the coil end of the stator is securely minimized in the axial direction.

Fourth Embodiment

In the above embodiments, the insulating film is peeled off to expose a conductor from the bonded portion of the coil segment. Therefore, the bonded portion is formed narrower than the main part of the coil segment from which the insulating film is not peeled off. Therefore, the coil segments from which the insulating film is only removed are overlapped in the axial direction. However, it cannot be said that the contact state between the ends of the coil segments is good.

Any one of or both ends of the coil segments forming the bonded portion is desirably molded in the axial direction in order to transfer the energy caused by the arc in the TIG welding from the opposite side to the stator core to the coil segment on a side near the stator core while making a good contact state between the ends of the coil segments.

Figure 15A:
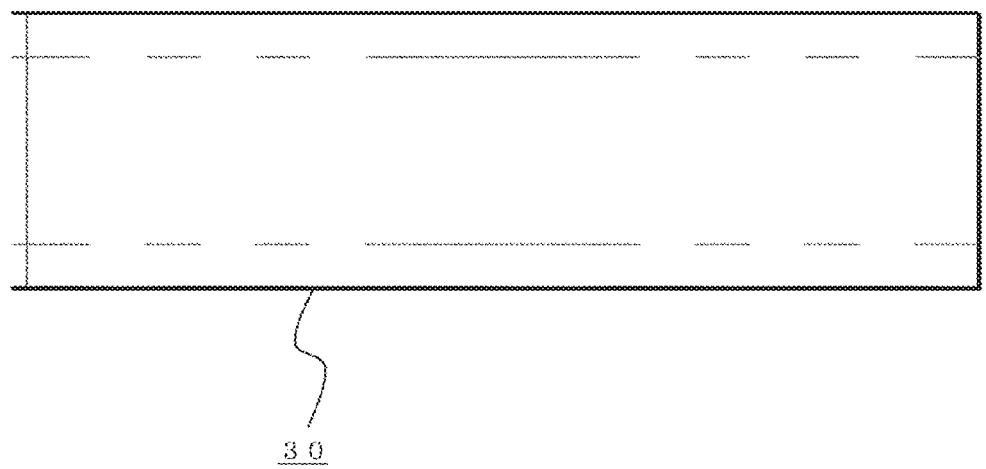
FIG. 15A is a diagram illustrating an example of a state before an insulating film of the end of the coil segment is peeled off.
Figure 15B:
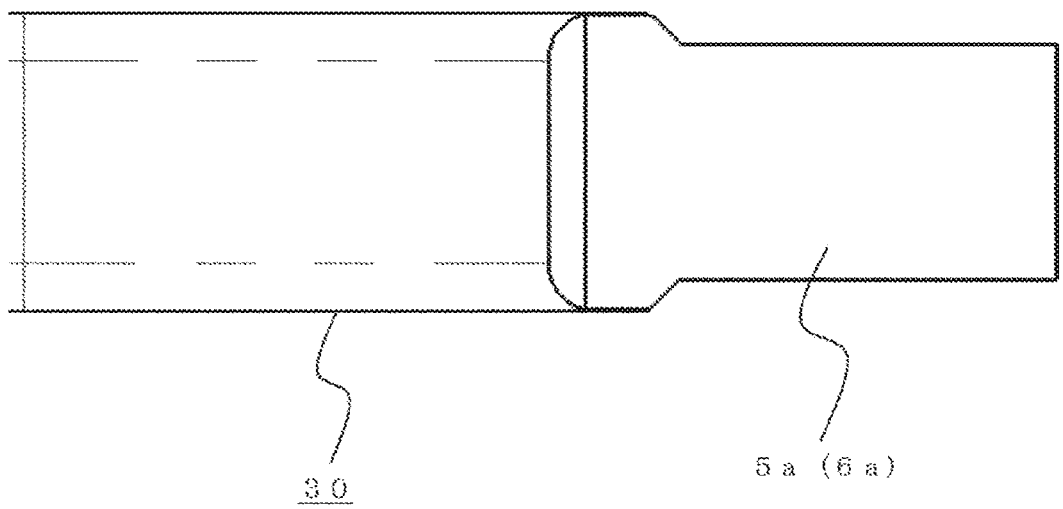
FIG. 15B is a diagram illustrating an example of a state after the insulating film of the end of the coil segment is peeled off.

For example, the end of the coil segment includes the insulating film as illustrated in FIG. 15a, but the insulating film is peeled off by mechanical processing or laser processing. FIG. 15b illustrates a state that the insulating film is peeled off. An end 30a of the coil segment in which the insulating film is peeled off to expose the conductor is thinner than the main part 30b of the coil segment.

Figure 15C:
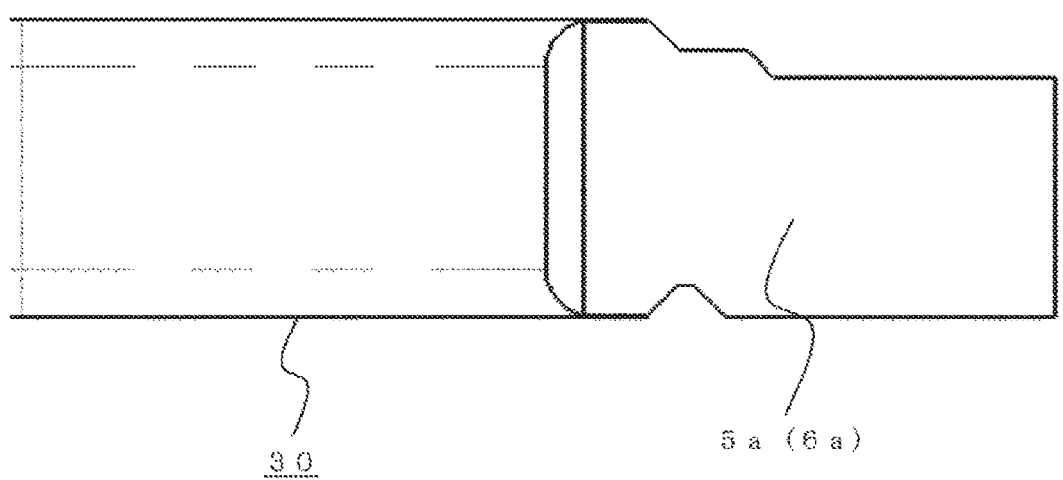
FIG. 15C is a diagram illustrating an example of a state where the end is molded after the insulating film of the end of the coil segment is peeled off (fourth embodiment).
Figure 15D:
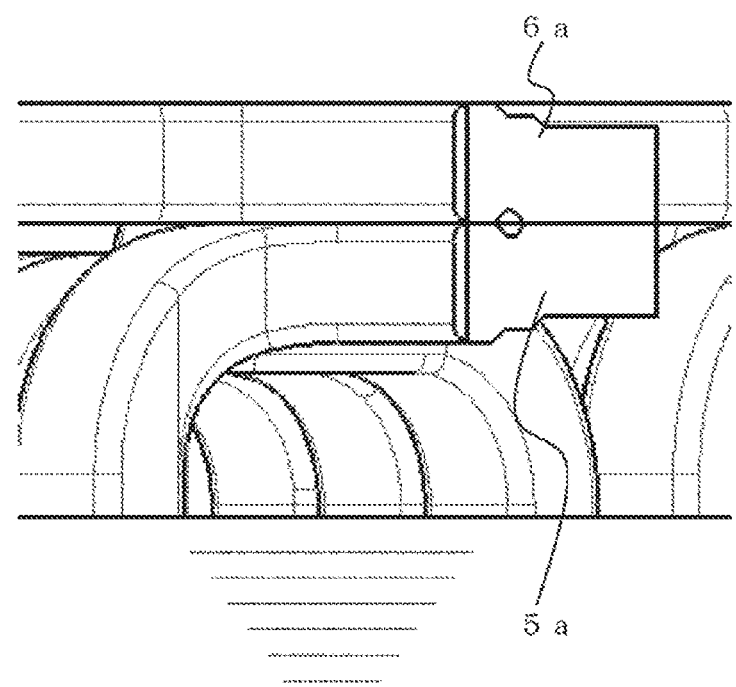
FIG. 15D is a diagram illustrating an example of a state where the ends of the molded coil segments are aligned in the axial direction after the insulating film of the end of the coil segment is peeled off (fourth embodiment).

For example, the ends of the coil segments are molded as illustrated in FIG. 15c and come close in order to make a secure contact between the ends of the coil segments when two coil segments are overlapped. The ends of the coil segments overlapped in the axial direction as illustrated in FIG. 15d enter a good contact state using the coil segments of which the ends are molded.

Figure 14A:
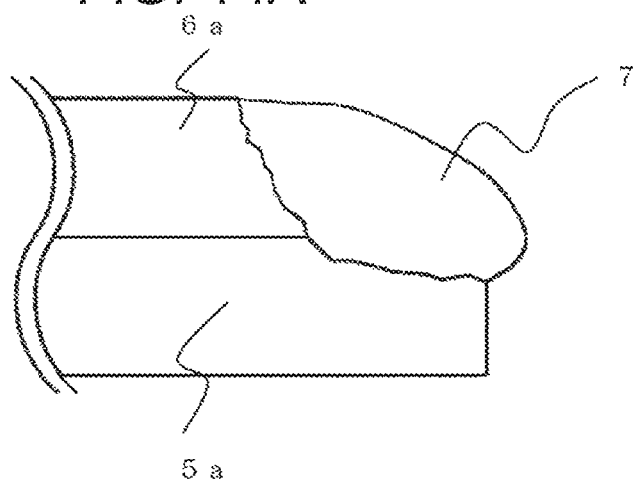
FIG. 14A is a diagram illustrating a bonding status of a bonding portion of the ends of the coil segments (fourth embodiment).
Figure 14B:
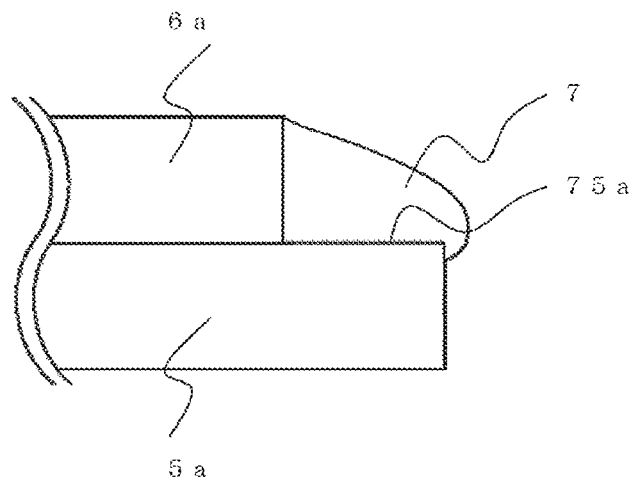
FIG. 14B is a diagram illustrating the bonding status of the bonding portion of the ends of the coil segments (fourth embodiment).
Figure 14C:
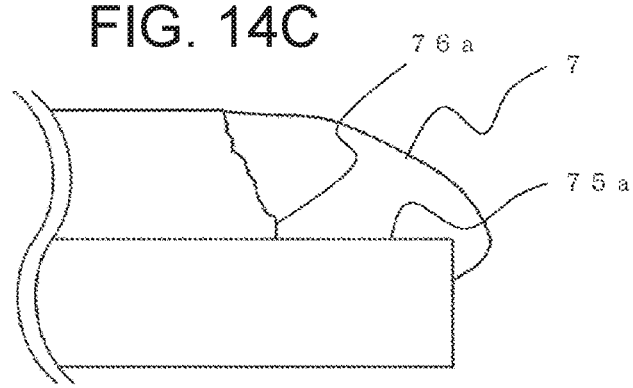
FIG. 14C is a diagram illustrating the bonding status of the bonding portion of the ends of the coil segments (fourth embodiment).

FIGS. 14a, 14b, and 14c illustrate states of the bonding portion 7 and the cross sections of the ends of the coil segments.

In the example illustrated in FIG. 14a, the end of the coil segment on the opposite side to the stator core is melted and flows down in a direction to the end of the coil segment on a side near the stator core. The end of the coil segment on a side near the stator core is melted in a portion on the opposite side to the stator core to form the bonding portion 7.

In the example illustrated in FIG. 14b, the conductors of the ends of the coil segments are not melted, the metal supplied from the outside is melted toward a side near the stator core of the end of the coil segment on a side near the stator core to form the bonding portion 7. A boundary 76a between the bonding portion 7 and the end 6a of the coil segment on the opposite side to the stator core, and a boundary 75a between the bonding portion 7 and the end 5a of the coil segment on a side near the stator core are diffused and bonded.

The example illustrated in FIG. 14c is a combination of the examples illustrated in FIGS. 14a and 14b, the ends of the coil segments include both a surface where the conductor of the end of the coil segment is melted to form the bonding portion and a surface where a diffusion bonding occurs. Further, FIG. 14c illustrates an example where the conductor of the end of the coil segment on the opposite side to the stator core is melted.

Fifth Embodiment

Figure 16:
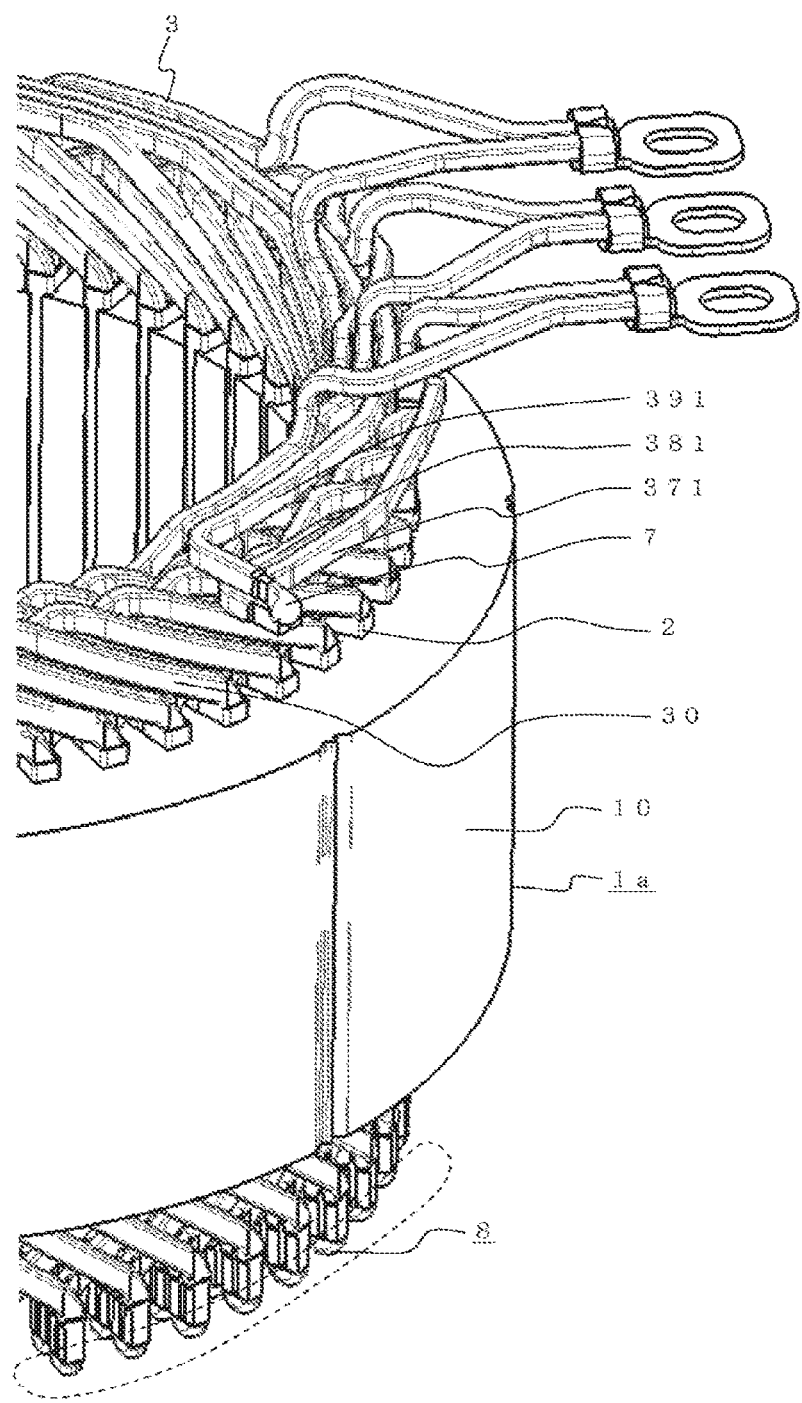
FIG. 16 is a perspective view partially illustrating a configuration of the stator of the rotary electric machine (Fifth embodiment).

Next, a configuration of the stator of the rotary electric machine according to a fifth embodiment of the invention will be described using FIGS. 16 to 18. FIG. 16 is a perspective view illustrating a configuration of a stator 1a of the rotary electric machine according to the fifth embodiment.

The stator 1a includes the stator core 10 formed with a plurality of slots, the coil segment 30 which is inserted to each slot of the stator core and forms one of a plurality of layers, and a plurality of corrugated circumferential windings which include crossover conductors forming the coil ends by connecting the ends on the same sides of the coil segments inserted into the different slots.

Since the stator 1a is a stator of the three-phase AC rotary electric machine of a Y-connection having 8 poles and 48 slots in double-parallel, there are 48 slots, and the stator winding 3 is divided into three-phase stator windings of U, V, and W phases.

Since the stator 1a of this embodiment is connected in the Y connection in double-parallel, there are two neutral points. One of these neutral points is configured such that a U-phase coil segment 371, a V-phase coil segment 381, and a W-phase coil segment 391 are bonded to be overlapped in the axial direction.

Figure 17:
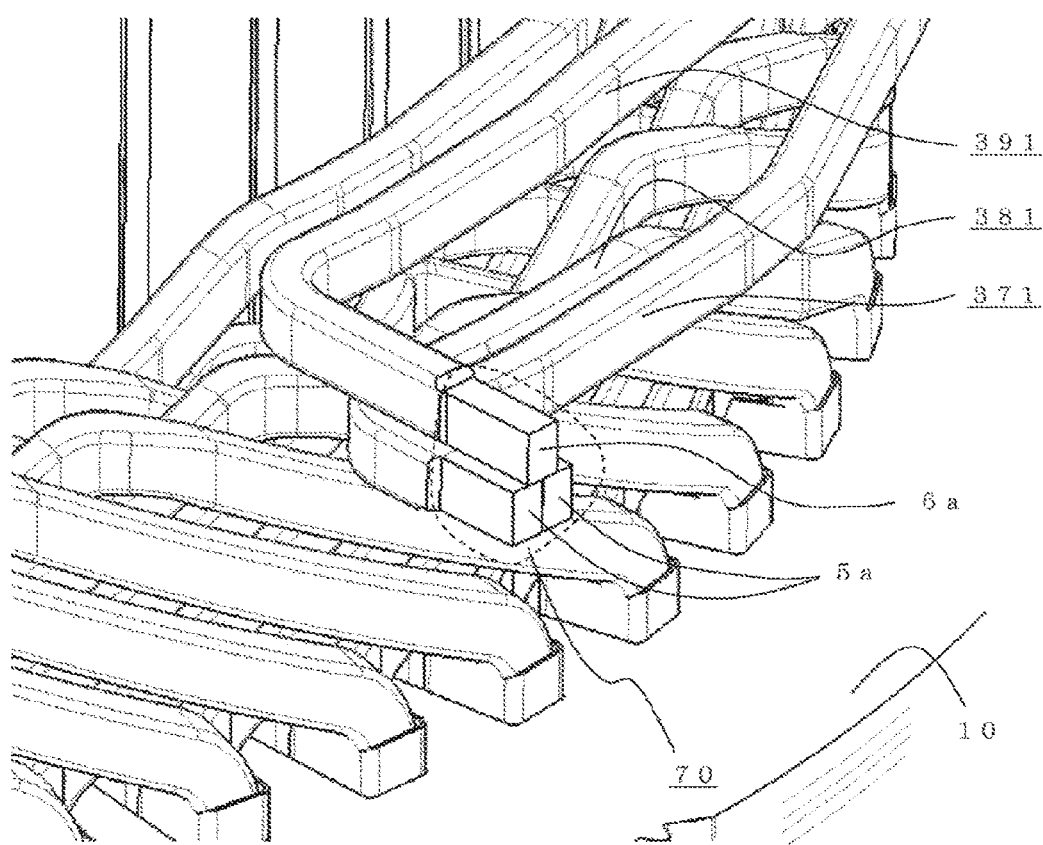
FIG. 17 is a diagram illustrating a shape before the ends of the coil segments are bonded (Fifth embodiment).

FIG. 17 illustrates a state before bonding the end of the U-phase coil segment 371, the end of the V-phase coil segment 381, and the end of the W-phase coil segment 391 which form the neutral point overlapped in the axial direction.

Three coil segments forming the neutral point are gathered in one place from the respective storing slots. Herein, the U-phase coil segment and the V-phase coil segment are disposed on a side near the stator core in the axial direction in the bonded portion 70, and the W-phase coil segment is disposed on the opposite side in the axial direction in the bonded portion 70.

The end 5a of the coil segment on a side near the stator core, and the end 6a of the coil segment on the opposite side to the stator core abut on each other in a state where the insulating film of the bonded portion 70 is removed and the conductors are exposed. The bonded portion 70 is bonded through an appropriate welding such as the TIG welding similarly to the first embodiment.

As described above, the TIG welding is performed from one end surface side among the coil segments, and the arc is generated between the welding electrode and the coil segment. In this embodiment, the electrode is disposed on a side surface of the end of the W-phase coil segment in the axial direction, and causes the end of the W-phase coil segment to be welded. The end of the melted W-phase coil segment is widely drawn onto the U-phase coil segment and the V-phase coil segment on the opposite side to the stator core.

When the bonding portion 7 at the neutral point is subjected to the TIG welding, the axial direction is set to the vertical direction. When the bonding is performed while the bonded portion 70 is disposed to face upward, the melted coil segment is easily drawn to the coil segment on a side near the stator core by its own weight.

On the other hand, an end 8 of the coil segment inserted to the different slot of the stator 1a is disposed in the axial direction, and a plurality of sets are connected in the radial direction. Therefore, the electrode is disposed in the bonded portion without causing interference between the electrode and the coil segment, so that the welding electrode is disposed in the axial direction which is a direction of the tip end of the end of the coil segment. In other words, the end of the coil segment necessary for the bonding in the stator 1a faces in the axial direction or the radial direction depending on the places.

However, the ends of the coil segments facing in the radial direction are overlapped in the axial direction, and bonded from the side surface direction of the end of the coil segment, so that the bonding is performed by disposing the welding electrode in the axial direction even when the coil segment of the stator 1a faces in any direction.

In addition, when the coil segment can be welded by disposing the welding electrode in the axial direction, the welding work can be performed with respect to the surface in the axial direction in which the stator is most stable. Therefore, the welding workability is extremely improved.

Figure 18:
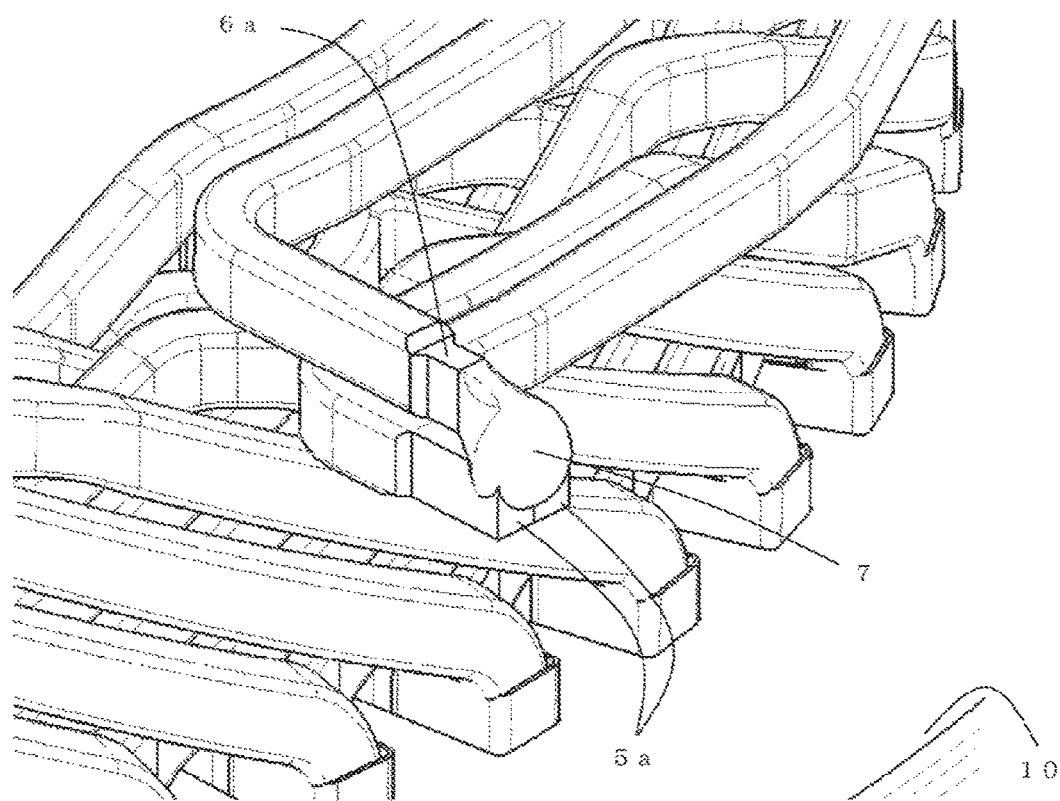
FIG. 18 is a diagram illustrating a shape after the ends of the coil segments are bonded (Fifth embodiment).

FIG. 18 illustrates the end of the coil segment in which, after the arc ends in the TIG welding, the melted portion is solidified, and the bonding portion 7 is formed and completely bonded. The melted portion is solidified after being drawn to the conductor at the end of the coil segment at a position near the stator core. Therefore, the motor is securely minimized in the axial direction without making the bonding portion protrude over the height (axial direction) of the coil segment on the opposite side to the stator core.

As described above, according to the invention, when the ends of the coil segments are bonded, the metal melted in the bonded portion is solidified after being drawn to the end of the coil segment at a position near the stator core. Therefore, the bonding portion is formed without inflating toward the opposite side to the stator core from the coil segment on the opposite side to the stator core, so that the stator is securely minimized in the axial direction.

Hitherto, the invention has been described on the basis of the embodiments. However, the invention is not limited to the above embodiments, and various modifications can be made. The embodiments are described in a clearly understandable way for the invention, and thus the invention is not necessarily to provide all the configurations described above.

For example, the embodiments have been described using the stator of the three-phase AC rotary electric machine, but the invention is not limited to the three-phase AC rotary electric machine.

Figure 19A:
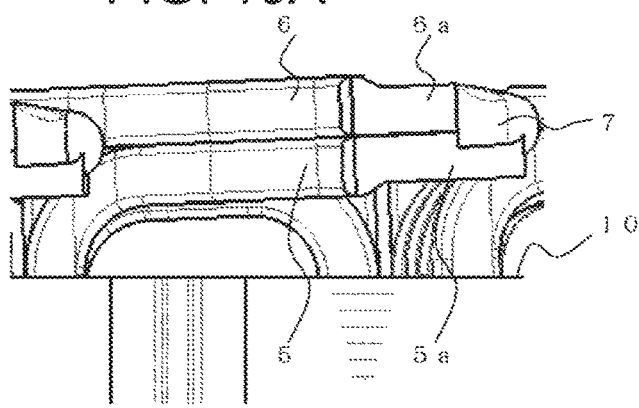
FIG. 19A is a diagram illustrating an example of a direction of the coil segment.
Figure 19B:
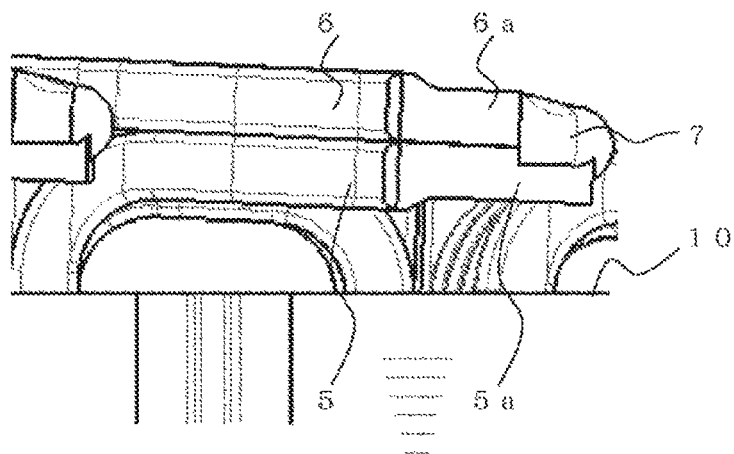
FIG. 19B is a diagram illustrating an example of a direction of the coil segment.

For example, in the embodiments, the coil segment faces in the vertical direction with respect to the axial direction as illustrated in FIG. 6. However, the direction is not limited to the vertical direction, and the coil segment may be disposed forming an angle to some degree with respect to the axial direction as illustrated in FIGS. 19a and 19b.

Figure 20:
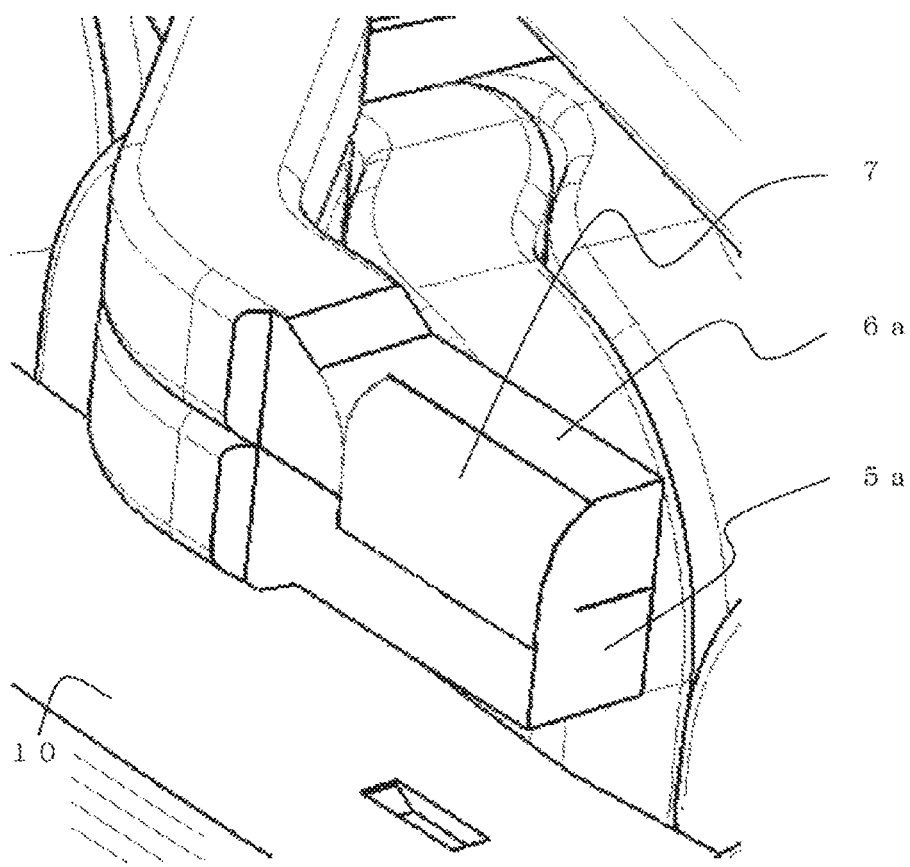
FIG. 20 is a diagram illustrating a variation of the bonding portion of the end of the coil segment.

For example, in the embodiments, the bonding portion is melted and flows in a direction of the tip end near the stator core from the tip end on the opposite side to the stator core. However, the bonding may be performed as illustrated in FIG. 20 in any direction as long as the direction is from the end of the coil segment on the opposite side to the stator core toward the end of the coil segment on a side near the stator core.

For example, in the embodiments, the end of the coil segment in the first embodiment faces in the circumferential direction, and the end of the coil segment in the fifth embodiment faces in the outer radial direction of the stator core. However, any direction may be applied as long as the ends of the coil segments are overlapped in the axial direction.

For example, the rotary electric machine of a serial concentrated winding type and the rotary electric machine of the Y-connection corrugated/distributed winding are exemplified in the embodiments. However, the invention is not limited to any winding scheme or connection scheme.

For example, the coil segments overlapped in two stages in the axial direction have been described to be bonded in the embodiments. However, the number of stages is not limited to two as long as the coil segments are overlapped and bonded in the axial direction.

For example, the flat coil is exemplified as the stator coil in the embodiment. However, the invention is not limited to the flat coil, and a round coil may be used.

For example, the description in the embodiments has been given about an example in which the end of the coil segment on a side near the stator core and the end of the coil segment on the opposite side to the stator core are both molded. However, the molding is not necessarily performed. The molding may be not performed or only a portion of the end of the coil segment forming the bonded portion may be molded.

For example, the description in the embodiments has been given about an example in which the ends of the coil segments are bonded by the TIG welding. However, the TIG welding is not necessarily used, and a MIG (Metal Inert Gas) welding, a plasma welding, a laser welding, or an electronic beam welding may be employed as long as the welding can be made by injecting energy in a short time.

REFERENCE SIGNS LIST 1 stator
10 stator core
2 insulating member
3 stator winding
30 coil segment
301 coil segment mounted in first teeth
301a end on winding start side of coil segment mounted in first teeth
301b end on winding end side of stator coil mounted in first teeth
302 stator coil mounted in second teeth
336 stator coil mounted in 36th teeth
5 coil segment on side near stator core
5a end of coil segment on side near stator core
6 coil segment on opposite side to stator core
6a end of coil segment on opposite side to stator core
7 bonding portion
70 bonded portion
8 bonding portion
91 gas nozzle
92 welding electrode
93 arc
94 brazing material
1a stator
371 U-phase coil segment forming neutral point
381 V-phase coil segment forming neutral point
391 W-phase coil segment forming neutral point

The invention claimed is:

1. A stator of a rotary electric machine, comprising:
a stator core that has a plurality of slots; and
a coil segment that is disposed in the stator core to form a stator winding,
wherein ends of the coil segments are overlapped in the axial direction, and bonded through a bonding portion, and
wherein the bonding portion is formed in a shape in which the bonding portion is melted and flows from the end of the coil segment on an opposite side to the stator core toward the end of the coil segment on a side near the stator core.

2. The stator of the rotary electric machine according to claim 1,
wherein the end of the coil segment is disposed in an upper portion of a yoke of the stator core in the axial direction to face in a circumferential direction.

3. The stator of the rotary electric machine according to claim 1,
wherein the bonding portion is configured by a melted coil segment.

4. The stator of the rotary electric machine according to claim 1,
wherein the bonding portion is configured by a material having a melting point lower than that of the coil segment.

5. The stator of the rotary electric machine according to claim 1,
wherein the end of the coil segment on the opposite side to the stator core is shorter than the end of the coil segment on a side near the stator core.

6. The stator of the rotary electric machine according to claim 1,
wherein a cross-sectional area of the end of the coil segment on an opposite side to the stator core among the coil segments forming the bonded portion is smaller than that of the end of the coil segment on a side near the stator core.

7. The stator of the rotary electric machine according to claim 1,
wherein the end of the coil segment on a side near the stator core and the end of the coil segment on the opposite side to the stator core are configured by conductors such that the conductors are exposed and come into contact with each other.

8. A rotary electric machine, comprising:
the stator according to claim 1; and
a rotor.

9. A method of manufacturing a stator of a rotary electric machine, the rotary electric machine including a stator core having a plurality of slots and a coil segment disposed in the stator core to form a stator winding, and ends of the coil segments being overlapped and bonded in the axial direction, the method comprising:
 welding the ends of the coil segments while an electrode is disposed in a side surface of the end of the coil segment on the opposite side to the stator core.

\* \* \* \* \*